United States Patent [19]

Kitazawa et al.

[11] Patent Number: 5,373,065
[45] Date of Patent: Dec. 13, 1994

[54] PROCESS FOR PRODUCING FORMAMIDE GROUP-CONTAINING COPOLYMER, AND THERMOPLASTIC RESIN COMPOSITION CONTAINING THE SAME

[75] Inventors: Naoki Kitazawa; Hiroshi Hotta, both of Kyoto; Yasuhisa Sugita; Katsutoshi Ohta, both of Chiba, all of Japan

[73] Assignee: Dai-Ichi Kogyo Seiyaku Co., Ltd., Kyoto, Japan

[21] Appl. No.: 149,525

[22] Filed: Nov. 9, 1993

Related U.S. Application Data

[62] Division of Ser. No. 921,343, Jul. 29, 1992.

[30] Foreign Application Priority Data

Jul. 31, 1991 [JP] Japan ................... 3-191595
Jul. 31, 1991 [JP] Japan ................... 3-191596

[51] Int. Cl.$^5$ ............... C08F 8/32; C08F 214/00; C08F 216/36; C08F 220/54; C08F 222/40; C08G 63/00
[52] U.S. Cl. ................... 525/382; 526/262; 526/291; 526/306; 526/316; 526/319; 526/332; 526/341; 526/347; 526/348; 525/282; 528/271
[58] Field of Search ............... 525/382, 282; 526/262, 526/291, 306, 316, 319, 332, 341, 347, 348; 528/271

[56] References Cited

U.S. PATENT DOCUMENTS

| | | | |
|---|---|---|---|
| 4,933,395 | 6/1990 | Canova et al. | 525/374 |
| 5,047,478 | 9/1991 | Ohmae et al. | 525/179 |
| 5,047,479 | 9/1991 | Ohmae et al. | 525/179 |

FOREIGN PATENT DOCUMENTS

| | | |
|---|---|---|
| 258040 | 3/1988 | European Pat. Off. |
| 328140 | 8/1989 | European Pat. Off. ... 525/374 |
| 400866 | 12/1990 | European Pat. Off. |
| 416360 | 3/1991 | European Pat. Off. |
| 2318218 | 2/1977 | France |
| 2135214 | 5/1990 | Japan |
| 2135215 | 5/1990 | Japan |

OTHER PUBLICATIONS

Section Ch, Week 9219, Mar. 24, 1992, Derwent Publications Ltd., London, GB; Class A26 AN 92-154565 & JP-A-4 091 131 (abstract).

Primary Examiner—Joseph L. Schofer
Assistant Examiner—Wu C. Cheng
Attorney, Agent, or Firm—Sughrue, Mion, Zinn, Macpeak & Seas

[57] ABSTRACT

A process for producing a novel formamide group-containing copolymer, or a salt thereof, which can be used as a high-molecular weight amino reagent, a starting material for functional high-molecular weight compounds, a starting material for adhesives, a polymer compatibilizer, a resin modifier, etc., and can undergo hydrolysis to give a copolymer containing a primary amino group, and a novel copolymer containing a primary amino group obtained by hydrolysis, which comprises reacting a compound having a recurring unit derived from styrene, olefins or derivatives thereof, a recurring unit derived from dienes such as butadiene, and a recurring unit derived from acid anhydrides such as maleic anhydride, with a salt of a specific primary diamine in the presence of a formyl group-containing compound such as formamide, to effect imidation and/or amidation, and then deacidifying the product with a base, or by imidation and/or amidation of the above-mentioned copolymer with a reaction product obtained by reacting a primary diamine with a formyl group-containing compound such as formamide.

5 Claims, No Drawings

PROCESS FOR PRODUCING FORMAMIDE GROUP-CONTAINING COPOLYMER, AND THERMOPLASTIC RESIN COMPOSITION CONTAINING THE SAME

This is a divisional of application Ser. No. 07/921,343, filed Jul. 29, 1992.

FIELD OF THE INVENTION

The present invention relates to a formamide group-containing copolymer and a process for producing the same. More particularly, the present invention relates to a novel formamide group-containing copolymer which can be used as a high-molecular weight amino reagent, a starting material for functional high-molecular weight compounds, a starting material for adhesives, a polymer compatibilizer, a resin modifier, etc. and can undergo hydrolysis to give a copolymer containing a primary amino group, a novel copolymer containing a primary amino group obtained by hydrolysis, and a process for producing the same with good efficiency. Also, the present invention relates to a thermoplastic resin composition, and more particularly to a thermoplastic resin composition comprising the above-mentioned formamide group-containing copolymer having two or more kinds of specified thermoplastic resins blended therewith, which not only enhances the miscibility between the resins but also is superior in the face impact strength, Izod impact strength external appearance, and hue.

BACKGROUND OF THE INVENTION

Heretofore, high-molecular weight compounds containing primary amino groups in their side chains have been effectively utilized in various industrial fields because of their high reactivity, that is, because they can easily react with functional groups such as aldehyde, ketone, alkyl halide, isocyanate, thioisocyanate, active double bond, epoxy compound, cyanamide, guanidine, urea, acid, acid anhydride, and acyl halide.

As such high-molecular weight compounds containing primary amino groups in their side chains, there have been heretofore known polyvinylamine produced by hydrolysis of poly-N-vinylacetamide or poly-N-vinylformamide and polyallylamine produced by polymerization of a hydrochloride of allylamine.

However, in the case where these methods are used to prepare a high-molecular weight compound, although a polymer or copolymer containing a primary amino group can be obtained, its molecular weight is not so great as intended, and these methods require radical polymerization of an amine or an amine precursor as a monomer which limits the kind of monomers to be copolymerized therewith. Therefore, these high-molecular weight compounds may not fully exert their effects in some applications.

As examples of copolymers containing amino groups in their side chains, there are disclosed in JP-A-2-135214 and JP-A-2-135215 (the term "JP-A" as used herein means an "unexamined published Japanese patent application") a copolymer obtained by imidation of a styrene-maleic anhydride copolymer with a mixture of primary and secondary diamines such as p-aminophenol and ethylaminoethylamine. It is proposed that these copolymers be used as potential epoxy hardeners. These copolymers also contain ethylamino groups in their side chains. However, the side chain functional groups thus obtained are secondary amino groups. In general, secondary amino groups have less general-purpose properties than primary amino groups. In this respect, these copolymers are not desirable.

Examples of copolymers in which primary amino groups have been probably unexpectedly incorporated partially in their chains include those disclosed in JP-A-64-70595 and JP-A-64-85246, and U.S. Pat. No. 4,137,185. That is, these copolymers are obtained by reacting a maleic anhydride-grafted ethylene propylene copolymer which is obtained by grafting an ethylene-propylene copolymer with maleic anhydride, with a polyamine containing at least two primary amino groups such as diethylenetriamine, ethlenediamine, and hexamethylenediamine so that it undergoes imidization. However, it is thought that the reaction of a maleic anhydride-grafted ethylene propylene copolymer with a polyfunctional polyamine generally involves a cross-linking reaction not a little during as well as after the reaction. If any cross linking reaction occurs during the reaction, it may often cause a rise in the viscosity of the reaction mixture and, hence, gelation thereof, disabling the continuance of the reaction.

Therefore, in these conventional techniques, it has been designed to end-cap primary amines present after imidization with acetic anhydride, n-octenylsuccinic anhydride, or the like for the purpose of inhibiting the thickness rise with a lapse of time due to the crosslinking reaction.

Further, JP-A-2-36248 suggests the reaction of an unsaturated acid anhydride-graft modified polyolefin with a diamine. However, this reference gives no clear statement of specific preparation methods and reaction products, and the present inventors' experiences show that crosslinking and gelation are unavoidable according to known methods.

As examples of the reaction of a maleic anhydride copolymer or a maleic anhydride-grafted ethylene propylene copolymer with a primary diamine, there are disclosed methods in JP-A-60-240749, JP-A-64-31864, JP-A-63-146928, JP-A-63-235365, and JP-A-63-199755. However, all these methods are intended for the imide crosslinking of an acid anhydride group with two primary amino groups in a solvent-free resin.

It is theoretically possible to undergo imidization with a primary diamine to form primary amino groups in side chains without causing any crosslinking reaction by raising the molar ratio of primary amino group/succinic anhydride group in the imidation reaction to such an extent that gelation caused by the crosslinking reaction can be subtantially neglected. However, this idea is not practical.

Some of the present inventors previously proposed an improved preparation method which overcomes these drawbacks accompanied by the conventional techniques and a novel copolymer obtained thereby (Japanese Patent Application No. Hei. 3-85735). In this proposal, there is suggested a method which comprises reacting a partial salt of a diamine with an acid, with a succinic anhydride group-containing copolymer and then allowing a base to contact with the reaction product to regenerate an amino group.

It has heretofore been considered to be technically difficult to obtain a copolymer with an excellent hue without causing any crosslinking reaction by allowing diamines to act on a polyfunctional copolymer containing a substituted or unsubstituted succinic anhydride group as a functional group to cause a high-molecular weight modification reaction to incorporate primary amino groups in side chains.

The present invention was worked out to overcome these difficulties.

SUMMARY OF THE INVENTION

The present inventors have made extensive studies to overcome these drawbacks of the conventional techniques. As a result, it has been found that a novel formamide group-containing copolymer can be obtained by a process which comprises reacting a compound having a recurring unit derived from styrene, olefins or derivatives thereof, a recurring unit derived from dienes such as butadiene, and a recurring unit derived from acid anhydrides such as maleic anhydride, with a salt of a specific primary diamine in the presence of a formyl group-containing compound such as formamide, to effect imidation and/or amidation, and then deacidifying the product with a base, or by imidation and/or amidation of the above-mentioned copolymer with a reaction product obtained by reacting a primary diamine with a formyl group-containing compound such as formamide and that a composition suitable for the above-mentioned objects can be obtained by hydrolysis of such a novel copolymer. The present invention has been worked out on the basis of this knowledge.

That is, the present invention provides a copolymer or a salt thereof containing in the molecule thereof:

(A) from 20 to 99.8 mole % of a recurring unit represented by formula (I), (B) from 50 to 0 mole % of a recurring unit represented by formula (II), and (C) a recurring unit containing a unit represented by formula (III), (D) a recurring unit containing a unit represented by formula (IV), and (E) a recurring unit containing a unit represented by formula (V) in a total amount of from 60 to 0.2 mole %, provided that the amount of said recurring unit (C) is at least 0.2 mole %:

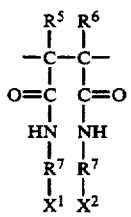

(I)

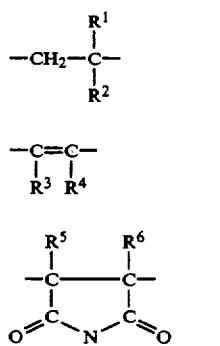

(II), (III), (IV)

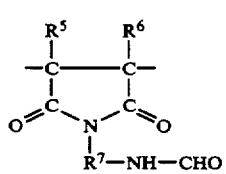

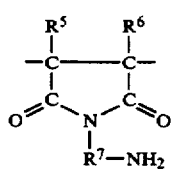

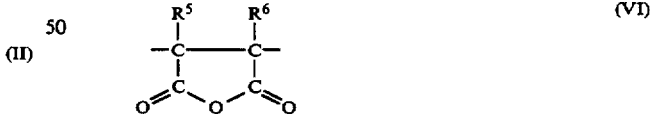

(V)

wherein $R^1$ and $R^2$ each independently represents a hydrogen atom, an alkyl group having from 1 to 10 carbon atoms, a cycloalkyl group having from 3 to 8 carbon atoms, an aryl group having from 6 to 10 carbon atoms, an alkenyl group having from 2 to 4 carbon atoms, an alkoxy group having from 1 to 4 carbon atoms, an alkoxycarbonyl group having from 1 to 18 carbon atoms, an alkylcarboxyl group having from 1 to 17 carbon atoms in the alkyl portion thereof, an alkylcarbonyl group having from 1 to 6 carbon atoms, an arylcarbonyl group having from 6 to 8 carbon atoms, a halogen atom, or a nitrile group; $R^3$ and $R^4$ each independently represents a hydrogen atom, an alkyl group having from 1 to 4 carbon atoms, an alkenyl group having from 2 to 4 carbon atoms, or a halogen atom; $R^5$ and $R^6$ each independently represents a hydrogen atom, an alkyl group having from 1 to 6 carbon atoms, or an aryl group having from 6 to 8 carbon atoms; $R^7$ represents an alkylene group having from 1 to 12 carbon atoms, a cycloalkylene group having from 5 to 17 carbon atoms, an arylene group having from 6 to 12 carbon atoms, an arylalkylene group having from 7 to 12 carbon atoms, or a polyoxyalkylene group having from 4 to 30 carbon atoms; $R^1$ to $R^7$ may be each the same or different in each of the recurring units; and $X^1$ and $X^2$ each independently represents $NH_2$ or NH—CHO.

The present invention also provides a process for producing the above-mentioned copolymer or a salt thereof, which comprises reacting a copolymer containing in the molecule thereof:

(a) from 20 to 99.8 mole % of a recurring unit represented by formula (I), (B) from 50 to 0 mole % of a recurring unit represented by formula (II), and (C') from 60 to 0.2 mole % of a recurring unit containing a unit represented by formula (VI):

(VI)

wherein $R^5$ and $R^6$ are as defined above, with a salt of a diamine represented by formula (VII):

$$H_2N—R^7—NH_2 \quad (VII)$$

wherein $R^7$ is as defined above, in the presence of at least one formyl group-containing compound selected from formamide, formic acid, and derivatives thereof, bringing the reaction product into contact with a base to undergo deacidification (process (a)).

The present invention further provides a process for producing the above-mentioned copolymer or a salt thereof, which comprises reacting a copolymer containing in the molecule thereof:

(A) from 20 to 99.8 mole % of a recurring unit represented by formula (I), (B) from 50 to 0 mole % of a recurring unit represented by formula (II), and (C') from 60 to 0.2 mole % of a recurring unit containing a unit represented by formula (VI), with a product obtained by reacting a diamine represented by formula (VII) with at least one formyl group-containing compound selected from formamide, formic acid, and derivatives thereof (process (b)).

The present invention still further provides a process for producing a copolymer and a salt thereof containing in the molecule thereof:

(A) from 20 to 99.8 mole % of a recurring unit represented by formula (I), (B) 50 to 0 mole % of a recurring unit represented by formula (II), and (D) a recurring unit containing a unit represented by formula (IV) and (E) a recurring unit containing a unit represented by formula (V) in a total amount of 60 to 0.2 mole %, provided that the amount of said recurring unit (D) is at least 0.2 mole % and that $X^1$ and $X^2$ each represents $NH_2$, which comprises hydrolyzing the above-mentioned copolymer under acidic conditions (process (c)) as well as the copolymer thus obtained or a salt thereof.

The present invention even further provides a thermoplastic resin composition, comprising as main components 100 parts by weight of a mixture of (i) from 5 to 95% by weight of a thermoplastic resin containing a functional group capable of reacting with an amino group and (ii) from 95 to 5% by weight of an olefinic polymer and/or a styrenic polymer; and (iii) from 0.05 to 20 parts by weight of a copolymer or a salt thereof containing in the molecule thereof:

(A) from 20 to 99.8 mole % of a recurring unit represented by formula (I);

(B) from 50 to 0 mole % of a recurring unit represented by formula (II); and (C) a recurring unit containing a unit represented by formula (IV), (D) a recurring unit containing a unit represented by formula (IV), and a recurring unit containing a unit represented by formula (V) in a total amount of from 60 to 0.2 mole %, provided that the amount of said recurring unit C is at least 0.2 mole %.

DETAILED DESCRIPTION OF THE INVENTION

The formamide group-containing copolymer of the present invention (including a salt thereof hereinafter) is a novel copolymer containing a recurring unit (A) represented by formula (I), a recurring unit (B) represented by formula (II), a recurring unit (C) containing a unit represented by formula (III), a recurring unit (D) containing a unit represented by formula (IV), and a recurring unit (E) containing a unit represented by formula (V) (the recurring units (B), (D) and (E) are not essential), which may be a random, block or graft copolymer. As mentioned above, the proportion of the recurring units (A) and (B) in the copolymer are from 20 to 99.8 mole %, preferably from 45 to 99 mole %, and from 50 to 0 mole %, preferably from 40 to 0 mole %, respectively based on the total amount of the recurring units (A), (B), (C), (D) and (E); and the sum of the proportion of the recurring units (C), (D) and (E) is in the range of from 60 to 0.2 mole %, based on the total amount of the recurring units (A), (B), (C), (D) and (E), provided that the proportion of the recurring unit (C) is 0.2 mole % or more and that the amount of the recurring units (D) and (E) each may be 0 mole %. In the sum of the proportion of the recurring units (C), (D) and (E), the proportion of the recurring unit (C) is preferably in the range of from 50 to 1 mole %, the proportion of the recurring unit (D) is preferably in the range of 40 mole % or less, and the proportion of the recurring unit (E) is preferably in the range of 40 mole % or less. If the proportion of the recurring unit (C) exceeds 60 mole %, it is disadvantageous in that the resulting copolymer exhibits deteriorated mechanical properties. On the contrary, if the proportion of the recurring unit (C) falls below 0.2 mole %, the features of the formamide group-containing copolymer of the present invention cannot be sufficiently developed.

The copolymer of the present invention basically comprises the above-mentioned recurring units (A), (B), (C), (D) and (E) but may further comprise other recurring units in a small amount.

The molecular weight of the copolymer of the present invention is not specifically limited but is normally in the range of from 3,000 to 500,000 as calculated in terms of viscosity average molecular weight. This range corresponds to a viscosity range of from 10 to 50,000 cps obtained when dissolving the formamide group-containing copolymer in a good solvent such as toluene, xylene, cumene, tetralin, 1,3-dimethyl-2-imidazolidinone, dimethyl sulfoxide, acetone, and methyl ethyl ketone in a proportion of 10% by weight.

The copolymer of the present invention is characterized in that it contains in side chains of the recurring unit (C) formamide groups or/and primary amino groups via an imide group or an amide group. Examples of the copolymer of the present invention include those comprising a salt formed when the above-mentioned primary amino group is bonded to an acid such as sulfuric acid, a sulfonic acid (e.g., benzenesulfonic acid, toluenesulfonic acid, naphthalenesulfonic acid), a halogenic acid (e.g., hydrochloric acid, hydrofluoric acid, hydrobromic acid), nitric acid, boric acid, and phosphoric acid.

The recurring unit (A) is represented by formula (I) wherein $R^1$ and $R^2$ may be the same or different and each independently represents a hydrogen atom; an alkyl group containing from 1 to 10 carbon atoms, preferably from 1 to 4 carbon atoms; a cycloalkyl group containing from 3 to 8 carbon atoms, preferably from 3 to 6 carbon atoms; an aryl group containing from 6 to 10 carbon atoms, preferably from 6 to 9 carbon atoms; an alkenyl group containing from 2 to 4 carbon atoms (e.g., vinyl, allyl); an alkoxy group containing from 1 to 4 carbon atoms; an alkoxycarbonyl group containing from 1 to 18 carbon atoms, preferably from 1 to 8 carbon atoms; an alkylcarboxyl group containing from 1 to 17 carbon atoms, preferably from 1 to 3 carbon atoms in the alkyl portion thereof; an alkylcarbonyl group containing from 1 to 6 carbon atoms, preferably 1 to 4 carbon atoms; an arylcarbonyl group containing from 6 to 8 carbon atoms; a halogen atom (e.g., chlorine, bromine); or a nitrile group. $R^1$ and $R^2$ may be each the same or different in each of the recurring units. In other words, examples of formula (I) include those wherein one of the recurring unit (A) is an ethylene unit ($R^1$ and $R^2$ each is a hydrogen atom at the same time) and the other is a propylene unit ($R^1$ is a hydrogen atom, and $R^2$ is a methyl group).

The recurring unit (B) is represented by formula (II) wherein $R^3$ and $R^4$ each independently represents a hydrogen atom; an alkyl group containing from 1 to 4 carbon atoms (e.g., methyl, ethyl); an alkenyl group containing from 2 to 4 carbon atoms (e.g., vinyl, allyl); or a halogen atom (e.g., chlorine, bromine). As in the case of $R^1$ and $R^2$, $R^3$ and $R^4$ may be each the same or different in each of the recurring units.

The recurring unit (C) contains a unit represented by formula (III) wherein $R^5$ and $R^6$ each independently represents a hydrogen atom; an alkyl group containing from 1 to 6 carbon atoms, preferably from 1 to 2 carbon atoms; or an aryl group containing from 6 to 8 carbon atoms; and $R^7$ represents an alkylene group containing from 1 to 12 carbon atoms, preferably from 1 to 8 carbon atoms (e.g., methylene, ethylene, propylene, tetramethylene, hexamethylene); a cycloalkylene group containing from 5 to 17 carbon atom, preferably from 6 to 10 carbon atoms (e.g., cyclohexylene, methylenecyclohexylmethylene); an arylene group containing from 6 to 12 carbon atoms (e.g., phenylene, oxydiphenylene); an arylalkylene group containing from 7 to 12 carbon atoms, preferably from 8 to 10 carbon atoms (e.g., xylylene); or a polyoxyalkene group containing from 4 to 30 carbon atoms, preferably from 4 to 15 carbon atoms (e.g., polyoxymethylene, polyoxypropylene). As in the case of $R^1$ and $R^2$, $R^5$ and $R^6$ may be each the same or different in each of the recurring units.

Further, the recurring unit (C) may be a unit represented by formula (III) itself, or may be a unit represented by formula (III-A) obtained by grafting the unit represented by formula (III).

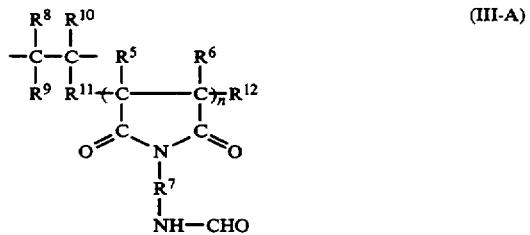

(III-A)

wherein $R^5$, $R^6$ and $R^7$ are as defined above; $R^8$ to $R^{10}$ have the same meaning as $R^1$ and $R^2$ or each independently represents a hydrogen atom; an alkyl group containing from 1 to 10 carbon atoms, preferably from 1 to 4 carbon atoms; an alkenyl group containing from 2 to 4 carbon atoms (e.g., vinyl, allyl); a cycloalkyl group containing from 3 to 8 carbon atoms, preferably from 3 to 6 carbon atoms; an aryl group containing from 6 to 10 carbon atoms, preferably from 6 to 9 carbon atoms; an alkoxy group containing from 1 to 4 carbon atoms; an alkoxycarbonyl group containing from 1 to 18 carbon atoms, preferably from 1 to 8 carbon atoms; an alkylcarboxyl group containing from 1 to 17 carbon atoms, preferably from 1 to 3 carbon atoms in the alkyl portion thereof; an alkylcarbonyl group containing from 1 to 6 carbon atoms, preferably from 1 to 4 carbon atoms; an arylcarbonyl group containing from 6 to 8 carbon atoms; a halogen atom (e.g., chlorine, bromine); or a nitrile group; $R^{11}$ is not present (i.e., represents a mere bond) or represents a methylene group or an ethylene group; and $R^{12}$ represents a hydrogen atom or an alkyl group containing from 1 to 10 carbon atoms, preferably from 1 to 8 carbon atoms. As in the case of $R^1$ and $R^2$, $R^5$ to $R^{12}$ may be each the same or different in each of the recurring units. The suffix n represents an integer of from 1 to 10, preferably from 1 to 3. When n is plural, i.e., 2 or more, $R^5$, $R^6$ and $R^7$ which are each present in a number corresponding to n may be each the same or different.

The recurring unit (D) contains a unit represented by formula (IV). The recurring unit (E) contains a unit represented by formula (V). In these formulae, $R^5$ to $R^7$ are as defined in formula (III). $X^1$ and $X^2$ each represents $NH_2$ or NH—CHO and may be the same or different.

The recurring unit (D) may be a unit represented by formula (IV) itself or may be a unit represented by formula (IV-A) obtained by grafting the unit represented by formula (IV). The recurring unit (E) may be a unit represented by formula (V) itself or may be a unit represented by formula (V-A) obtained by grafting the unit represented by formula (V).

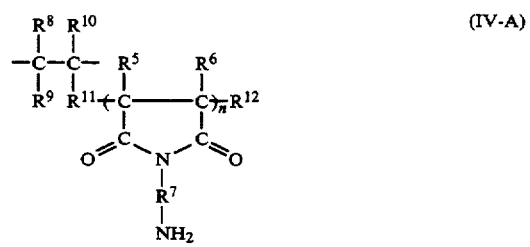

(IV-A)

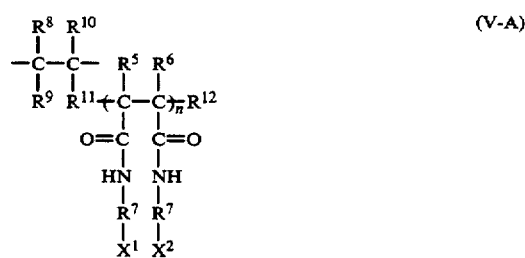

(V-A)

wherein $R^5$ to $R^{12}$, $X^1$, $X^2$ and n are as defined above.

The preparation of the copolymer of the present invention is not limited to specific processes but may be accomplished by various processes. In accordance with the above-mentioned processes (a) and (b), the copolymer of the present invention can be prepared more efficiently.

The copolymer comprising the recurring units (A), (B) and (C') as the starting materials of the process of the present invention can be prepared by subjecting monomers giving recurring units represented by formulae (I) and (II) with a monomer giving a recurring unit represented by formula (VI) to ordinary radical polymerization or ionic polymerization, or by subjecting monomers giving recurring units represented by formulae (I) and (II) to ordinary radical polymerization or ionic polymerization, and then allowing a monomer giving a recurring unit represented by formula (VI) to undergo graft reaction with the polymerization product.

Specific examples of monomers giving the recurring unit (A) represented by formula (I) include various compounds such as olefins (e.g., ethylene, propylene, 1-butene, isobutylene, 1-octene), cyclic olefins (e.g., cyclopentene, cyclohexene, cyclooctene), styrenes (aromatic vinyl compounds) (e.g., styrene, α-methylstyrene, vinyltoluene, p-t-butylstyrene), vinyl esters (e.g., vinyl acetate, vinyl butyrate, vinyl stearate), vinyl ethers (e.g., methyl vinyl ether, ethyl vinyl ether), halogeno olefins (e.g., vinyl chloride, vinylidene chloride), acrylic or methacrylic acid esters (e.g., methyl (meth)acrylate, ethyl (meth)acrylate, butyl (meth)acrylate, hexyl (meth)acrylate, cyclohexyl (meth)acrylate, decyl (meth)acrylate, octadecyl (meth)acrylate, methoxyethyl (meth)acrylate), nitriles (e.g., acrylonitrile, methacrylonitrile), and vinyl ketones (e.g., methyl vinyl ketone, phenyl vinyl ketone). These monomers can be used singly or in combination. Preferred among these monomers are ethylene, propylene, styrene, methyl vinyl ether, isobutylene, vinyl acetate, and (meth)acrylic acid esters. Further, hydrogenated products of polymers of isoprene, butadiene, etc. can be used.

Specific examples of monomers giving the recurring unit (B) represented by formula (II) include conjugated dienes such as butadiene, isoprene, and chloroprene. These conjugated dienes can be used singly or in combination. Preferred among these monomers are butadiene and isoprene.

Examples of the recurring unit (C') containing a unit represented by formula (VI) include anhydrous unsaturated dicarboxylic acids, such as maleic anhydride, methylmaleic anhydride, 1,2-dimethylmaleic acid, ethylmaleic anhydride, phenylmaleic anhydride, and itaconic anhydride, obtained by subjecting a monomer giving the recurring unit (A) and a monomer giving the recurring unit (B) to a known copolymerization, and then treating the resulting copolymer with a known peroxide or initiator.

The recurring unit (C') may be a unit represented by formula (VI) itself or may be a unit represented by formula (VI-A) obtained by grafting the unit represented by formula (VI).

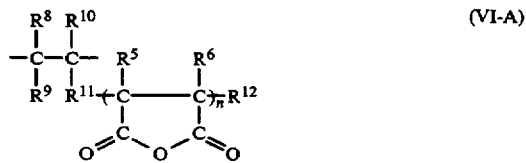

wherein $R^5$, $R^6$, $R^8$ to $R^{12}$, and n are as defined above

The recurring unit (C') containing a unit represented by formula (VI-A) can be formed by subjecting a monomer giving the above-mentioned recurring unit (A) and a monomer giving the above-mentioned recurring unit (B) to known copolymerization, and then allowing the resulting copolymer to undergo a graft reaction with an anhydrous unsaturated dicarboxylic acid such as maleic anhydride, methylmaleic anhydride, 1,2-dimethylmaleic acid, ethylmaleic anhydride, phenylmaleic anhydride, and itaconic anhydride in the presence of a known peroxide or initiator. (A) preferred grafting monomer is maleic anhydride. The graft reaction proceeds as the grafting monomer such as maleic anhydride is connected to the portion of the recurring unit (A) or (B). As the starting material of the process of the present invention including the recurring unit (C') there can be also used a polymer commercially available as a polymer grafted with the above-mentioned anhydrous unsaturated dicarboxylic acid (e.g., maleic acid-modified EPR, maleic acid-modified SEBS).

Thus, examples of the copolymer containing the recurring units (A), (B) and (C') as the starting material of the process of the present invention include a styrene-maleic anhydride copolymer, an ethylene-maleic anhydride copolymer, a propylene-maleic anhydride copolymer, an ethylene-propylene-maleic anhydride copolymer, an isobutylene-maleic anhydride copolymer, a methyl vinyl ether-maleic anhydride copolymer, a styrene-isoprene-maleic anhydride copolymer, an ethylene-maleic anhydride-ethyl acrylate copolymer, an ethylene-maleic anhydride-methyl acrylate copolymer an ethylene-vinyl acetate-maleic anhydride copolymer, and a styrene-butadiene-maleic anhydride copolymer. Further examples include copolymers obtained by allowing polymers or copolymers obtained by allowing polymers or copolymers such as polyethylene, polypropylene, polyisoprene and hydrogenated products thereof, polybutadiene and hydrogenated products thereof, chloroprene rubber and hydrogenated products thereof, nitrile rubber and hydrogenated products thereof, ethylene-propylene copolymers, ethylene-(meth)acrylic acid ester copolymers, styrene-isoprene copolymers and hydrogenated products thereof, and styrene-butadiene copolymers and hydrogenated products thereof (the copolymers may be any of random copolymers, block copolymers and alternating copolymers) to undergo a graft reaction with an anhydrous unsaturated dicarboxylic acid such as maleic anhydride, methylamaleic anhydride, ethylmaleic anhydride, and itaconic anhydride. However, the present invention should not be construed as being limited thereto.

In accordance with the process (a) of the present invention, the copolymer comprising the recurring units (A), (B) and (C') thus prepared is allowed to undergo a reaction with a salt of a primary diamine represented by formula (VII) in the presence of at least one formyl group-containing compound selected from formamide, formic acid, and derivatives thereof. As mentioned above, the formyl group-containing compound to be used herein can be selected from formamide, formic acid, and derivatives thereof, which are commercially available. Examples of formamide derivatives include nitrogen-substituted formamides such as N-methylformamide, N-ethylformamide, N-butylformamide, N,N-dimethylformamide, N,N-diethylformamide, N-methylformanilide, and N-ethylformanilide. Examples of formic acid derivatives include formic acid esters such as methyl formate, ethyl formate, propyl formate and butyl formate, and formic acid salts such as sodium formate, potassium formate, and ammonium formate.

Specific examples of the diamine represented by formula (VII) include straight-chain or branched alkylenediamines such as ethylenediamine, 1,3-diaminopropane, 1,4-diaminobutane, 1,5-diaminopentane, hexamethylenediamine, 1,7-diaminoheptane, 1,8-diaminooctane, 1,9-diaminononane, 1,10-diaminodecane, 2,2,5-trimethylhexanediamine, and 2,2,4-trimethylhexanediamine; alicyclic diamines such as isophoronediamine, 1,3-bis-(aminomethyl)cyclohexane, bis(4-aminocyclohexyl)methane, bisaminomethylhexahydro-4,7-methaneindane, 1,4-cyclohexanediamine, 1,3-cyclohexanediamine, 2-methylcyclohexanediamine, 4-methylcyclohexanediamine, and bis(4-amino-3,5-dimethylcyclohexyl)methane, arylalkyldiamine such as m-xylylenediamine and p-xylylenediamine; aryldiamines such as p-phenylenediamine and 4,4'-diaminophenyl ether; and polyoxyalkylenediamines such as polyoxypropylenediamine and polyoxyethylenediamine. Particularly preferred among these diamines are aliphatic and alicyclic diamines.

Such a diamine may be in the form of either a partially neutralized salt (monosalt) or a completely neutralized salt (disalt). The diamine is preferably in the form of a partially neutralized salt to give a high reaction efficiency.

The above-mentioned diamine is preferably used in the form of a salt obtained by partially neutralizing an acid. As such an acid there may be preferably selected ones with an acid strength higher than carboxylic acids. Specific examples of such an acid include sulfuric acid; sulfonic acids such as benzenesulfonic acid, toluenesulfonic acid, and naphthalenesulfonic acid; halogenic acids such as hydrochloric acid, hydrofluoric acid, hydrobromic acid, and hydroiodic acid; nitric acid; boric acid; and phosphoric acid. Preferred among these acids are hydrochloric acid and toluenesulfonic acid.

In the preparation of the above-mentioned diamine salt, the above-mentioned diamine and the above-mentioned acid are used in a molar proportion, based on the total amount of amino groups in the diamine, corresponding to from 50 to 100% of the neutralization degree as calculated in terms of acid equivalent. If this value falls below 50%, crosslinking and gelation are unavoidable during the imidization reaction. On the contrary, if this value exceeds 100%, the imidization reaction takes a prolonged period of time, giving an economical disadvantage. Thus, this value preferably ranges from 50 to 80%.

The diamine salt can be easily prepared by neutralization reaction of the corresponding diamine with the corresponding acid. For example, a salt obtained by adding a diamine dropwise to an alcohol solution of an acid may be concentrated as necessary, recrystallized from an alcohol, and then isolated to give a product which may be used as a starting material. Alternatively, a diamine and an acid may be reacted with each other in the above-mentioned formyl group-containing compound or an aprotic polar solvent such as 1,3-dimethyl-2-imidazolidinone (DMI), N-methyl-2-pyrrolidone, dimethyl sulfoxide (DMSO), dimethylsulfone, dioxane, 1,2-dimethoxyethane, triamide hexamethylenephosphate, and tetramethylurea to form a partially neutralized salt which is then used directly in the reaction of the present invention. In the light of the operational efficiency, the formyl group-containing compound is preferably used to form a salt which is used then directly in the reaction of the present invention.

In the process (a) of the present invention, the reaction product thus obtained may be brought into contact with a base to undergo deacidification.

As another process for obtaining the copolymer of the present invention, there may be used the process (b) of the present invention, which comprises allowing the copolymer containing the above-mentioned recurring units (A), (B) and (C') to undergo imidation or imidation and amidation simultaneously using as a reaction reagent a product obtained by reacting a diamine represented by formula (VII) with the above-mentioned formyl group-containing compound.

The reaction reagent can be prepared by allowing a diamine to imidation or amide exchange at a temperature of 60° C. to 180° C., preferably 80° C. to 150° C. for 2 to 5 hours in an amount of one mole or more, preferably from 1.5 to 5 mole per mole of the formyl group-containing compound. In this reaction, if the formyl group-containing compound is formic acid, water is preferably distilled off. If the formyl group-containing compound is a formic acid ester, the alcohol is preferably distilled off. If the formyl group-containing compound is a formamide, the ammonia or amine is preferably distilled off. The resulting product may be directly used for the subsequent imidation reaction or as an amidation reagent. However, the product usually contains unreacted diamines which can cause crosslinking and gelation. Therefore, the product is preferably heated under reduced pressure to distill off the unreacted diamines. Alternatively, if the unreacted diamines are high-boiling point diamines, they are preferably once neutralized with hydrochloric acid or the like and then subjected to recrystallization, whereby they are removed as a dihydrochloride.

The processes (a) and (b) of the present invention proceed as the copolymer comprising the above-mentioned recurring units (A), (B) and (C') reacts with a salt of a diamine represented by formula (VII) and a formyl group-containing compound, or with a product obtained by reacting a diamine with a formyl group-containing compound. The imidation reaction may be effected in a state free of a solvent by means of a screw extruder. However, for the purpose of avoiding local reaction and making the reaction homogeneous, an inert solvent is preferably used besides the formyl group-containing compound as a solvent. Examples of inert solvents which can be used for such a purpose include aromatic hydrocarbons such as benzene, toluene, xylene, cumene, cymene, ethyltoluene, propylbenzene, and diethylbenzene; alicyclic hydrocarbons such as methylcyclopentane, cyclohexane, ethylcyclopentane, methylcyclohexane, 1,1-dimethylcyclohexane, and ethylcyclohexane; aliphatic hydrocarbons such as hexane, heptane, octane, decane, methylheptane, 3-ethylhexane, and trimethylpentane; and aprotic polar solvents such as DMI, tetramethylurea, dimethylsulfone, dioxane, 1,2-dimethoxyethane, triamide hexamethylenephosphate, DMSO, and N-methyl-2-pyrrolidone.

In accordance with the processes (a) and (b) of the present invention, reactive groups having significantly different polarities are reacted with each other. In general, a nonpolar solvent and a polar solvent are preferably used at the same time.

The amount of the above-mentioned solvent to be used is not specifically limited but can be properly selected. In general, the amount of the solvent to be used may be in the range of from 0.3 to 20 times, preferably from 1 to 10 times, the weight of the copolymer comprising the recurring units (A), (B) and (C') to be used as the starting material (i.e., polyfunctional copolymer comprising a substituted or unsubstituted succinic anhydride as a functional group). If this value falls below 0.3 time, the dilution effect is insufficient, giving a highly thick reaction mixture that can cause some difficulties. On the contrary, if this value exceeds 20 times, no improvements in the effects of the solvent corresponding to the extra addition of the solvent can be recognized, giving economical disadvantages.

The proportion of the above-mentioned inert solvent to the formyl group-containing compound (inert solvent/formyl group-containing compound) is not specifically limited but is generally in the range of from 40/60 to 100/0 by weight (100/0 corresponds to the process (b)), preferably from 50/50 to 95/5.

In the present invention, if as the substrate for imidation and amidation, there is used a product obtained by reacting a diamine with a formyl group-containing compound, the use of a formyl group-containing compound as a solvent is not required. In the other case (i.e., process (a)), the use of a formyl group-containing compound is essential not as a solvent but as a reaction substrate. In this case, the formyl group-containing compound is used in the form of a mixture with an inert solvent to be used for dilution. The proportion of the formyl group-containing compound is preferably increased depending on the proportion of the functional group in the starting material, to likely provide a higher solubility of the substrate and a higher reaction rate.

The imidation reaction and amidation reaction in the processes (a) and (b) of the present invention do not particularly require catalysts. If any used, a tertiary amine such as trimethylamine, triethylamine, tributylamine, N,N-dimethylaniline, N,N-diethylaniline, and 1,8-diazabicyclo(5.4.0)undecene-7 is suitable.

In the present invention, the proportion of the copolymer, the diamine or salt thereof, and the formyl group-containing compound used as starting materials depends on the kind and conditions of the starting materials used and thus cannot be unequivocally determined but is normally in the range of from 1.0 to 10 mole, preferably from 1.05 to 5.0 mole, per mole of the substituted or unsubstituted succinic anhydride group (i.e., recurring unit (C')) contained in the starting copolymer based on the amount of the unneutralized or unreacted amino group in the diamine. If this value falls below 1.0 mole, some succinic anhydride groups are left unimidated or unamidated after the completion of the reaction. In the process (a) of the present invention, a primary amino group regenerated in the deacidification process reacts with the succinic anhydride groups to give amide crosslinkage that causes gelation, eliminating the effects of the present invention. On the contrary, if this value exceeds 10 mole, the imidation or amidation advantageously proceeds rapidly but causes an ecomical disadvantage requiring a large amount of a reaction reagent.

In the processes (a) and (b) of the present invention, the reaction temperature and reaction time depend on the kind of the solvent used and the presence of catalyst but are normally in the range of from 100° C. to 250° C., preferably from 110° C. to 200° C., and from 1 to 20 hours, respectively. If the reaction temperature falls below 100° C., it is disadvantageous in that the reaction requires a prolonged period of time. On the contrary, if the reaction temperature exceeds 250° C., the reaction product is likely colored, and the formamide group thus incorporated likely undergoes thermal decomposition.

Therefore, if the above-mentioned reaction is effected in a state free of a catalyst or at a relatively low temperature, or with a reaction reagent in a small molar proportion to the starting material, the production yield of the recurring units (C) and (D) are high while that of the recurring unit (E) is so small as to be substantially neglected.

On the other hand, if the above-mentioned reaction is effected in the presence of the above-mentioned catalyst or at an elevated temperature, or with a reaction reagent in a large molar proportion to the starting material, the production yield of the recurring unit (E) increases.

Concerning the proportion of the formamide group to the amino group, if as the imidation or amidation reagent there is used a reaction product between a diamine and a formyl group-containing compound, a copolymer comprising a formamide group in an amount of substantially 100% can be obtained. Further, if a diamine salt is used, a copolymer comprising a mixture of a formamide group and an amino group is obtained. In this case, the higher the reaction temperature is, or the longer the reaction time is, the higher is the production yield of the formamide group.

Thus, under the above-mentioned reaction conditions, a copolymer can be obtained with a (recurring unit (C)+recurring unit (D))/recurring unit (E) proportion of from 100/0 to 30/70 and a formamide group/amino group proportion of from 100/0 to 30/70.

The formulations of the copolymer of the present invention can be determined by the peak intensity ratio of carbonyl carbon (W) in the imide ring, carbonyl carbon (Y) in the amide and carbonyl carbon (Z) in the formamide group appearing in the vicinity of 176 to 180 ppm, 172 to 174 ppm and 162 ppm, respectively, in a chemical shift obtained by measuring nuclear magnetic resonance ($^{13}$C-NMR) using isotope carbon.

In the process (a) of the present invention, the order of charging the starting materials is not specifically limited but can be widely selected. In general, to the formyl group-containing compound (or a solution thereof in another solvent) may be added a salt of the above-mentioned diamine with an acid in the form of a powder or solution to make a solution to which the copolymer comprising the recurring units (A), (B) and (C') is then gradually added. This order of charging may be reversed. During this process, the charging of the materials may be effected while the solvent (or formyl group-containing compound) is heated under reflux.

Also in the process (b) of the present invention, the order of charging the starting materials is not specifically limited but can be widely selected. In general, the copolymer comprising the recurring units (A), (B) and (C') may be uniformly dissolved in a solvent to make a solution to which a product obtained by reacting the above-mentioned diamine with the formyl group-containing compound is then gradually added. This order of charging may be reversed. During this process, the charging of the materials may be effected while the solvent is heated under reflux.

Since imidation or amidation reaction of the starting copolymer with a diamine salt and a formyl group-containing compound, or with a product obtained by reacting a diamine with a formyl group-containing compound proceeds with the production of water, the water produced azeotropically boils together with the solvent used. By removing the azeotropically boiled water from the reaction system by means of a Dean-Stark water separator or the like, the reaction can proceed efficiently.

The completion of the imidation or amidation reaction can be confirmed by recognizing that the water azeotrope no longer occurs or that the infrared absorption spectrum of a specimen sampled from the reaction mixture no longer shows an increase in the absorption intensity of carbonyl in the imide in the vicinity of 1,700 $cm^{-1}$.

The reaction mixture contains a salt of the copolymer of the present invention to which a formamide group or a formamide group and a primary amino group are bonded via an imide bond or an imide bond and an amide bond. This reaction mixture may be, directly or optionally in the form of a powder obtained by charging it in a nonsolvent such as methanol, isopropanol, isobutanol, hexane and water, brought into contact with an aqueous solution of a base or optionally a solution of the base in a mixture of methanol and water to undergo deacidification to convert it into a free amine. Specific examples of such a base to be used in the deacidification include water-soluble bases such as sodium hydroxide, potassium hydroxide, lithium hydroxide, sodium carbonate, potassium carbonate, sodium bicarbonate, potassium bicarbonate, ammonia, methylamine, ethylamine, trimethylamine, and triethylamine. Preferred among these bases are sodium hydroxide, sodium carbonate, and sodium bicarbonate for economic reasons. In accordance with the process (b) of the present invention, no salt of the copolymer is produced, requiring no such a deacidification process.

The purification of a copolymer comprising a formamide group alone can be easily accomplished by charging the reaction product thus obtained in the above-mentioned nonsolvent such as methanol, isopropanol, isobutanol, hexane, and water, and then recovering the resulting precipitate in the form of a powder.

The process for the conversion of the formamide group in the copolymer thus obtained into a primary amino group is not specifically limited but may be selected from known processes. For example, the copolymer containing a formamide group may be treated in the form of a solution in a proper solvent or a dispersion with an aqueous solution of a mineral acid such as hydrochloric acid and hydrofluoric acid, or may be hydrolyzed to convert the formamide group into a salt of the corresponding primary amine. Preferably, the copolymer may be hydrolyzed under acidic conditions as in the process (c) of the present invention.

In the process (c), the acidic conditions are not specifically limited. In general, the pH value is preferably in the range of 3 or less. The hydrolysis is preferably effected with a mineral acid such as hydrochloric acid and sulfuric acid.

The primary amine salt thus obtained can be optionally converted into a free primary amine by the same method as mentioned above.

In the present invention, it can be presumed that when a partially neutralized salt of diamine or a product obtained by reacting a diamine with a formyl group-containing compound, i.e., a partial formamide of diamine, is used as an imidation reagent in the presence of a formyl group-containing compound, the reactivity of one end of the diamine is suppressed while the primary amine at the other end selectively contributes to the imidation or amidation reaction, making it possible to smoothly obtain the desired copolymer without causing any crosslinking. Even in the case where a partially neutralized salt of diamine is used, a formamide group is contained in the reaction product. This is probably because the diamine salt undergoes an amide exchange reaction with the formyl group-containing compound used as a solvent during the reaction.

In the present invention, the formamide group thus produced serves as a primary amine protective group which can inhibit side reactions during the imidation reaction at an elevated temperature, making it possible to obtain a copolymer with a good hue.

The formamide group-containing copolymer thus obtained can be optionally converted into an amino group. Alternatively, if the copolymer is used as a polymer compatibilizer, a resin modifier, or the like, it can undergo thermal decomposition to become a more active functional group.

The copolymer of the present invention can be melt-kneaded with a thermoplastic resin such as engineering plastics and an olefinic polymer and/or a styrenic polymer to obtain a resin composition which exhibits excellent impact properties (particularly face impact properties) and external appearance and reduced coloring and undergoes no peeling.

That is, the present invention further provides a thermoplastic resin composition comprising as main components 100 parts by weight of a mixture of (i) from 5 to 95% by weight of a thermoplastic resin containing a functional group capable of reacting with an amino group and (ii) from 95 to 5% by weight of an olefinic polymer and/or a styrenic polymer; and (iii) from 0.05 to 20 parts by weight of the above-mentioned copolymer or a salt thereof.

The composition of the present invention comprises the components (i), (ii) and (iii) as mentioned above. The component (i) may contain a functional group capable of reacting with an amino group. In other words, it can be considered that the formamide group contained in the component (iii) undergoes a carbon monoxide removal reaction by the heat generated during the melt kneading to convert the copolymer containing the formamide into a copolymer containing an amino group. Therefore, any compound containing a functional group capable of reacting with an amino group which is considered to be produced from the component (iii) can be used as the component (i). It can be further considered that during the melt-kneading the component (iii) is converted into an amino group with a high reactivity which then rapidly reacts with the component (i), making it difficult to cause side reactions such as coloring. It can therefore be considered that this process causes reduced coloring as compared to the case where a (polymer) reagent containing an amino group is used during the melt-kneading.

Specific examples of the functional group capable of reacting with an amino group include groups consisting of carboxylic acids, other organic acids, esters and salts thereof, acid anhydrides, salts thereof, hydroxyl groups, thiol, oxazoline groups, epoxy groups, isocyanate groups, amide bond, carbonate bond, urethane bond, urea bond, and ether bond. As the component (i) there may be preferably used a thermoplastic resin containing at least one bond selected from carbonate bond, ester bond, amide bond and ether bond.

Typical examples of the thermoplastic resin containing a carbonate bond to be used as the component (i) include polycarbonate resins which may be aliphatic or aromatic. The molecular weight of these polycarbonate resins is not specifically limited but is normally in the range of from 10,000 to 100,000, preferably from 10,000 to 40,000 as calculated in terms of number-average molecular weight in the light of the moldability and physical properties of the resulting composition. These polycarbonate resins may be terminated by a usual monovalent phenol group (e.g., phenol, halogen-substituted phenol, alkyl-substituted phenol such as cumylphenol and octylphenol, other various substituted phenols). Alternatively, these polycarbonate resins may contain the above-mentioned functional group or bond capable of reacting with an amino group in the form of a graft, block or random copolymer, or may be terminated by the above-mentioned functional group or bond. Further, for the purpose of modification or reinforcement, these polycarbonate resins may further comprise elastomers, fillers or other various additives incorporated therein during or after polymerization.

These polycarbonate resins can be prepared by various known methods such as a phosgene method, an ester interchange method and a melt polymerization method.

There are various kinds of the above-mentioned polycarbonate resins such as those containing a recurring unit represented by formula (VIII):

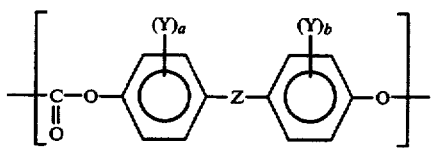

wherein Z represents a mere bond or an alkylene group containing from 1 to 8 carbon atoms, an alkylidene group containing from 2 to 8 carbon atoms, a cycloalkylene group containing from 5 to 15 carbon atoms, a cycloalkylidene group containing from 5 to 15 carbon atoms, $SO_2$, SO, O, CO, or a group represented by the following formula:

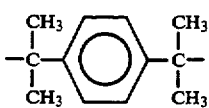

Y represents a hydrogen atom, a chlorine atom, a bromine atom, or a saturated alkyl group containing from 1 to 8 carbon atoms; and a and b each represents an integer of from 0 to 4.

The preparation of such a polycarbonate resin can be accomplished by the solvent process, i.e., a reaction with a divalent phenol and a carbonate precursor such as phosgene in the presence of a known acid acceptor and a molecular weight adjustor in a solvent such as methylene chloride, or an ester interchange reaction with a divalent phenol and a carbonate precursor such as diphenyl carbonate.

Examples of divalent phenols which can be preferably used include bisphenols. In particular, 2,2-bis(4-hydroxyphenyl)propane (commonly referred to as "bisphenol A") is preferred. Further, compounds obtained by partially or entirely substituting bisphenol A by other divalent phenol. Examples of divalent phenols other than bisphenol A include compounds such as hydroquinone, 4,4'-dihydroxydiphenyl, bis(4-hydroxyphenyl)alkanes, bis(4-hydroxyphenyl)cycloalkanes, bis(4-hydroxyphenyl)sulfide, bis(4-hydroxyphenyl)sulfone, bis(4-hydroxyphenyl)sulfoxide, and bis(4-hydroxyphenyl)ether; and halogenated bisphenols such as bis(3,5-dibromo-4-hydroxyphenyl)propane and bis(3,5-dichloro-4-hydroxyphenyl)propane. Such divalent phenols may be a homopolymer or two or more kinds of copolymers of divalent phenols, or a blend thereof. Further, such a polycarbonate resin may be a thermoplastic random-branched polycarbonate obtained by reacting a polyfunctional aromatic compound with a divalent phenol and/or a carbonate precursor.

Examples of thermoplastic resins containing a carbonate bond other than the above-mentioned polycarbonate resins include polyarylate resins and polyester polycarbonate resins, and these resins can be preferably used in the present invention.

As the resin used as the component (i), thermoplastic resins containing an ester bond, i.e., polyester resins, can be used in addition to the resins containing a carbonate bond. The kind of the polyester resin is not specifically limited but can be selected from many varieties. The polyester resin may be either aliphatic or aromatic. In the light of physical properties, the latter polyester resin is preferred. The molecular weight of the polyester resin can be properly selected depending on the purpose but is normally in the range of from 0.2 to 2.0 dl/g, preferably from 0.5 to 1.2 dl/g in terms of intrinsic viscosity. The polyester resin may be terminated by a carboxylic acid or alcoholic hydroxyl group. The proportion of such a terminal group is not specifically limited but is preferably in the range of from 9/1 to 1/9. Alternatively, the polyester resin may contain the above-mentioned functional group or bond capable of reacting with an amino group in the form of a graft, block or random copolymer, or may be terminated by the above-mentioned functional group or bond. Further, for the purpose of modification or reinforcement, the polyester resin may further comprise elastomers, fillers or other various additives incorporated therein during or after polymerization. Moreover, the polyester resin may contain two or more kinds of dicarboxylic acids so far as the physical properties thereof are not impaired.

Such a polyester resin can be prepared by various known methods. There are many varieties of such a polyester resin.

Specific examples of the polyester resin which can be used in the present invention include polyethylene terephthalate (PET), polybutylene terephthalate (PBT), polycyclohexadimethylene terephthalate (PCT), and polyarylates. Particularly preferred among these polyester resins is polyethylene terephthalate. Such polyethylene terephthalate may be a polyester consisting of an aromatic dicarboxylic acid component mainly comprising terepthalic acid and a glycol component mainly comprising ethylene glycol, or a polyester obtained by copolymerization of other dicarboxylic acid component and glycol component.

As the resin to be used as the component (i) there can be used a thermoplastic resin containing an amide bond, i.e., a polyamide resin. The kind of the polyamide resin is not specifically limited but can be selected from many varieties. The polyamide resin may be either aliphatic or aromatic. The molecular weight of the polyamide resin is not specifically limited but is normally in the range of from 4,000 to 50,000, preferably from 5,000 to 30,000 as calculated in terms of number-average molecular weight in the light of the moldability and physical properties of the resulting composition. Alternatively, the polyamide resin may contain the above-mentioned functional group or bond capable of reacting with an amino group in the form of a graft, block or random copolymer, or may be terminated by the above-mentioned functional group or bond. Further, for the purpose of modification or reinforcement, the polyamide resin may further comprise elastomers, fillers or other various additives incorporated therein during or after polymerization.

Such a polyamide resin can be prepared by various known methods such as ring opening (co)polymerization or (co)polycondensation of a 3-membered or more cyclic lactam or a polymerizable ω-amino acid or dibasic acid with a diamine. More particularly, such a polyamide resin can be prepared by (co)polymerization of ε-caprolactam, aminocaproic acid, 11-aminoundecanoic acid, etc., or (co) polycondensation of a diamine such as hexamethylenediamine, nonamethylenediamine, undecamethylenediamine, dodecamethylenediamine and metaxylylenediamine with a dicarboxylic acid such as terepthalic acid, isophthalic acid, adipic acid, sebasic acid, dibasic dodecanoic acid, and glutaric acid.

As such a polyamide resin there can be selected from many varieties. Specific examples of such a polyamide resin include aliphatic polyamides such as nylon 6 (polyamide 6), nylon 6,6, nylon 6,10, nylon 11, nylon 12, nylon 6,12, and nylon 4,6; aliphatic copolymeric polyamides such as nylon 6/6,6, nylon 6/6,10, and nylon 6/6,12; and aromatic polyamides such as polyhexamethylenediamine terephthalimide, polyhexamethylenediamine isophthalamide and xylene group-containing polyamides (e.g., nylon-MXD (methaxylylenediamine)). Further examples of such a polyamide resin include polyester amides, polyether amides and polyester-ether amides. Particularly preferred among these polyamide resins are nylon 6 and nylon 6,6.

As the resin to be used as the component (i) there can be further used a thermoplastic resin containing an ether bond, i.e., a polyether resin. The kind of the polyether resin is not specifically limited but can be selected from many varieties. The polyether resin may be either aliphatic or aromatic. Alternatively, the polyamide resin may contain the above-mentioned functional group or bond capable of reacting with an amino group in the form of a graft, block or random copolymer, or may be terminated by the above-mentioned functional group or bond.

There are many varieties of such a polyether resin. These polyether resins can be roughly divided into some groups: polyacetal homopolymers such as polyoxymethylene (POM); polyacetal copolymers comprising a mixture of polyether unti components, such as a trioxane-ethylene oxide copolymer; polyphenylene ether (PPE); polyether sulfone (PES) comprising a mixture of an ether group and a sulfone group; polyether ketone (PEK) comprising a mixture of an ether group and a carbonyl group; polyphenylene sulfide (PPS) containing a thioether group; and polysulfone (PSO). Preferred among these polyether resins are polyacetals (polyoxymethylene (POM)) and polyphenylene ether (PPE).

The above-mentioned polyacetal homopolymer is a polymer containing an oxymethylene unit as a main molecular chain and can be prepared by homopolymerization of formaldehyde or trioxane. On the other hand, the above-mentioned polyacetal copolymer is a copolymer comprising an oxyalkylene unit such as an oxyethylene unit, an oxypropylene unit and an oxytetramethylene unit, or an oxyphenylethylene unit mixed in a chain consisting of the above-mentioned oxymethylene unit. Such a polyacetal copolymer can be prepared by copolymerization of formaldehyde or trioxane with a cylic ether such as ethylene oxide.

In the composition of the present invention, as the component (i) there can be used one or a mixture of two or more kinds of the above-mentioned resins. On the other hand, as the component (ii) there can be used an olefinic polymer, a styrenic polymer, or a mixture thereof. The kind of the olefinic polymer is not specifically limited, but any resin containing a polyolefin component can be used. Many varieties of such an olefinic polymer can be used. Specific examples of such a polyolefinic resin include polyethylene (such as linear low-density polyethylene (LLDPE), low-density polyethylene (LDPE), very low-density polyethylene (VLDPE) and high-density polyethylene (HDPE)), polypropylene, polybutene, polyisobutene, ethylene-α-olefin copolymers (such as an ethylene-propylene copolymer, an ethylene-propylene copolymer rubber (EPR), an ethylene-butene copolymer (EBM), an ethylene-propylene-diene copolymer (EPDM), an ethylene-propylene-butene copolymer, and an ethylene-butylene copolymer), copolymers of propylene with other α-olefins (such as a propylene-butene copolymer), various ethylenic copolymers (such as an ethylene-vinyl acetate copolymer (EVA), an ethylene-vinyl alcohol copolymer (EVOH), an ethylene-maleic anhydride copolymer, and an ethylene-alkyl (meth)acrylate copolymer), poly (4-methyl-1-pentene), and mixtures thereof. These copolymers include random, block, random block and graft copolymers.

The molecular weight of the above-mentioned olefinic polymers can be properly selected depending on various conditions but is normally in the range of from 5,000 to 300,000, preferably from 10,000 to 200,000 as calculated in terms of number-average molecular weight.

As the styrenic polymer to be used as the component (ii) there may be used any compound containing a styrene component such as styrene, α-methylstyrene, and p-methylstyrene. The kind of such a styrenic polymer is not specifically limited. Examples of such a styrenic polymer include general-purpose polystyrene (GPPS), high-impact polystyrene (HIPS), syndiotactic polystyrene (SPS), a styrene-maleic acid copolymer (SMA), a styrene-maleimide copolymer, rubber-reinforced SMA, an MS resin, an AS resin, and an ABS resin (including a high-heat resistance ABS resin, an AAS resin, an AES resin, etc.). Further examples of such a styrenic polymer include so-called styrenic thermoplastic elastomers such as an SEBS resin, an SEPS resin, an SEP resin, and derivatives thereof.

The molecular weight of the above-mentioned styrenic polymer can be properly selected depending on various conditions but is normally in the range of from 20,000 to 300,000, preferably from 30,000 to 200,000 as calculated in terms of number-average molecular weight.

In the composition of the present invention, the proportion of the component (i) to the component (ii) is in the range of from 5:95 to 95:5, preferably from 30:70 to 95:5 (by weight). If the mixing proportion of the components (i) and (ii) deviates from the above-specified range, it causes some disadvantages. If the mixing proportion of the component (i) exceeds the above-specified range, the moldability of the composition is deteriorated. On the other hand, the mixing proportion of the component (ii) exceeds the above-specified range, the resulting composition suffers from insufficiency of mechanical strengths such as rigidity.

The mixing proportion of the component (iii) based on a total of 100 parts by weight of the components (i) and (ii) is in the range of from 0.05 to 20 parts by weight, preferably from 0.5 to 10 parts by weight. If the mixing proportion of the component (iii) falls below 0.05 part by weight, the resulting composition leaves much to be desired in various physical properties such as face impact strength. On the contrary, if the mixing proportion of the component (iii) exceeds 20 parts by weight, there can be recognized no improvements in the effects of the present invention corresponding to the extra addition, giving economical disadvantages and ill-balancing the physical properties of the resin composition.

The resin composition of the present invention comprises the components (i), (ii) and (iii) and may further comprise other additives (e.g., reinforcements such as glass fibers and carbon fibers, inorganic fillers, thermal stabilizers,, antioxidants, photo-stabilizers, fire retardants, weathering agents, plasticizers, antistatic agents, release agents, foaming agents) incorporated therein as necessary.

In the preparation of the resin composition of the present invention, these components may be melt-kneaded at an elevated temperature by means of a kneader such as a single-screw extruder, a twin-screw extruder, a Banbury mixer, a kneading roll, a Brabender, and a kneader, or a mixer such as a Henshel mixer. In this process, the order of kneading is not specifically limited but can be properly selected. The kneading temperature depends on the kind and blended amount of components used and the desired physical properties of the composition to be prepared and cannot be unequivocally determined but is normally in the range of from 180° to 340° C.

The preparation of the resin composition of the present invention can be accomplished by kneading a proper combination of the components (i), (ii) and (iii). Taking into account the compatibility among these components, for example, if the component (ii) is an olefinic polymer, the component (iii) is preferably an olefinic formamide group-containing compound (e.g., a compound obtained by incorporating a formamide group in an ethylene-ethyl acrylate-maleic anhydride copolymer). Further, if the component (ii) is a styrenic polymer, the component (iii) is preferably a styrenic formamide group-containing compound (e.g., a compound obtained by incorporating a formamide group in a styrene-maleic anhydride copolymer).

The present invention will be further described in the following examples but the present invention should not be construed as being limited thereto.

REFERENCE EXAMPLE 1

(Preparation of partially neutralized salt of ethylenediamine with p-toluenesulfonic acid)

In a 1-l capacity flask equipped with a thermometer, a stirrer, a dropping funnel and a reflex condenser were charged 300 ml of methanol and 95 g (0.5 mole) of p-toluenesulfonic acid monohydrate to make a solution.

To the solution was added dropwise a solution of 150 g (2.5 mole) of ethylenediamine in 300 ml with cooling in an ice bath at a rate such that the temperature was kept at 10° C. to 20° C. After completion of the dropwise addition, the mixture was heated to a temperature of 70° C. The methanol and unreacted ethylenediamine were then distilled off under reduced pressure. As a result, 132.7 g of a white solid was deposited.

The white solid thus obtained was recovered and filtered into a slurry with 300 ml of toluene. The slurry was washed with 100 ml of toluene twice to obtain a white powder which was then dried under reduced pressure. The yield was 109.8 g.

The white powder was titrated with 0.5N hydrochloric acid with bromophenol blue being used as an indicator to determine the neutralization equivalent and neutralization degree. The results are set forth in Table 1.

REFERENCE EXAMPLE 2

(Preparation of partially neutralized salt of ethylenediamine with hydrochloric acid)

A monohydrochloride of ethylenediamine was prepared in the form of a white powder in the same manner as in Reference Example 1 using the same reaction vessel as used in Reference Example 1, except that a 35% aqueous solution of hydrochloric acid was used instead of the p-toluenesulfonic acid. The neutralization equivalent and neutralization degree determined in the same manner as in Reference Example 1 are set forth in Table 1.

REFERENCE EXAMPLE 3

(Preparation of partially neutralized salt of hexamethylenediamine with p-toluenesulfonic acid)

95 g (0.5 mole) of p-toluenesulfonic acid monohydrate was dissolved in 500 ml of dimethylformamide (DMF) in the same reaction vessel as used in Reference Example 1 at room temperature. 52.2 g (0.45 mole) of hexamethylenediamine was gradually added to and dissolved in the solution in such a manner that the temperature of the solution did not exceed 20° C. to prepare a DMF solution a partially neutralized salt of hexamethylenediamine with p-toluenesulfonic acid. The neutralization equivalent and neutralization degree per solid content determined in the same manner as in Reference Example 1 are set forth in Table 1.

REFERENCE EXAMPLES 4 & 5

A salt of a diamine with an acid was prepared in the same manner as in Reference Example 3, except that the kinds of the diamine and acid used were altered as shown in Table 1. The neutralization equivalent and neutralization degree of the salt per solid content are set forth in Table 1.

TABLE 1

| | Diamine | Acid | Solvent used | Concentration of solid content of salt (%) | Neutralization equivalent (eq/g) | Neutralization degree (%) |
|---|---|---|---|---|---|---|
| Reference Example 1 | Ethylenediamine | p-Toluenesulfonic acid | None | 100 | $4.21 \times 10^{-3}$ | 50.7 |
| Reference Example 2 | Ethylenediamine | Hydrochloric acid | None | 100 | $10.15 \times 10^{-3}$ | 50.7 |
| Reference example 3 | Hexamethylenediamine | p-Toluenesulfonic acid | DMF | 20.5 | $2.81 \times 10^{-3}$ | 56.4 |
| Reference Example 4 | 1,3-Bis(aminomethyl)cyclohexanediamine | p-Toluenesulfonic acid | DMF | 20.0 | $2.90 \times 10^{-3}$ | 53.0 |
| Reference Example 5 | m-Xylylenediamine | p-Toluenesulfonic acid | Formamide | 25.0 | $2.35 \times 10^{-3}$ | 59.1 |

REFERENCE EXAMPLE 6

(Preparation of reaction product of ethylenediamine with formamide)

45 g (1.0 mole) of formamide was gradually added dropwise to 300 g (5.0 mole) of ethylenediamine at room temperature in the same reaction vessel as used in Reference Example 1. The reaction system was then allowed to undergo a reaction at an elevated temperature of 80° C. to 120° C. for 5 hours. During this process, the evolution of ammonia gas was recognized.

After completion of the reaction, the unreacted ethylenediamine was distilled off at a temperature of 61° C. under a pressure of 88 mmHg to obtain a residue. The results determined by the neutralization titration of the residue are set forth in Table 2.

REFERENCE EXAMPLE 7

(Preparation of reaction product of hexamethylenediamine with DMF)

DMF was added dropwise to hexamethylenediamine to effect the reaction in the same manner as in Reference Example 6. The reaction mixture was dissolved in a solvent (7:3 (volumetric ratio) mixture of ethanol and water), neutralized with 35% hydrochloric acid, and then concentrated, followed by recrystallization. The resulting hydrochloride of hexamethylenediamine in a needle crystal form was removed by filtration. The results determined by the potentiometric titration of the concentrated residue are set forth in Table 2.

REFERENCE EXAMPLE 8

(Preparation of reaction product of 1,3-bis(aminomethyl)cyclohexanediamine with DMF)

DMF was added dropwise to 1,3-bis(aminomethyl)-cyclohexanediamine to effect the reaction in the same manner as in Reference Example 7. The reaction mixture was filtered. The results determined by the potentiometric titration of the concentrated residue are set forth in Table 2.

REFERENCE EXAMPLE 9

(Preparation of reaction product of m-xylylenediamine with formic acid)

272 g (2.0 mole) of m-xylenediamine and 23 g (0.5 mole) of formic acid were allowed to undergo a reaction at a temperature of 120° C. for 10 hours while water was distilled off in a Dean-Stark water separator. The resulting product was treated in the same manner as in Reference Example 7 to obtain the desired reaction product. The results of potentiometric titration are set forth in Table 2.

TABLE 2

| | Diamine | Formyl group-compound | Neutralization equivalent (eq/g) |
|---|---|---|---|
| Reference Example 6 | Ethylenediamine | Formamide | $10.79 \times 10^{-3}$ |
| Reference Example 7 | Hexamethylenediamine | DMF | $6.25 \times 10^{-3}$ |
| Reference Example 8 | 1,3-Bis (aminomethyl)-cyclohexanediamine | DMF | $5.11 \times 10^{-3}$ |
| Reference Example 9 | m-Xylylene | Formic acid | $5.50 \times 10^{-3}$ |

EXAMPLE 1

In a 1-l capacity flask equipped with a thermometer, a stirrer, a dropping funnel and a Dean-Stark water separator were charged 300 ml of DMF and 18.2 g of ethylenediamine p-toluenesulfonate. The mixture was heated to a temperature of 80° C. to make a solution.

A solution of 100 g of a styrene-maleic anhydride (molar ratio: 95/5) copolymer (NMP-1) (weight-average molecular weight (Mw): 52,000; number-average molecular weight (Mn): 25,000) in 400 ml of xylene was added dropwise to the solution through the dropping funnel.

After completion of the dropwise addition, the reaction mixture was partially recovered and measured for infrared absorption spectra. As a result, the absorption due to the anhydrous ring at a wavelength of 1,780 $cm^{-1}$ completely disappeared.

As the reaction system was kept heated up to near 140° C., the reflux of xylene was accompanied by the azetropy of water which was then separated through the Dean-Stark water separator.

The reaction was continued at a temperature of 140° C. for 15 hours. When the production of water was no longer recognized, the reaction was stopped. The reaction mixture was then charged in 5 l of methanol. The product was recovered as a precipitate.

A part of the precipitate was dissolved in toluene. A cast film was then prepared from this solution. The cast film was measured for infrared absorption spectra. There were observed an absorption due to the imide ring at 1,768 $cm^{-1}$ and 1,697 $cm^{-1}$, an absorption due to the foramide group at 1,664 $cm^{-1}$ (shoulder) and 1,530 $cm^{-1}$, and an absorption due to p-toluenesulfonic acid, which was not observed in the styrene-maleic anhydride copolymer as the starting material, at 1,100 $cm^{-1}$ and 580 $cm^{-1}$. It was thus confirmed that a formamide group and a primary amino group were bonded to a polystyrene via an imide bond in the form of p-toluenesulfonate.

The precipitate thus obtained was dipped in a solution of 7.0 g of potassium carbonate in a 1:1 (volumetric ratio) mixture of water and methanol overnight, filtered off, thoroughly washed with water and methanol, and then dried. The yield was 101.5 g.

The copolymer (FAP-1) thus obtained was a white powder soluble in toluene. The copolymer was then dissolved in toluene in a proportion of 10% by weight and measured for viscosity by means of a B type viscometer at a temperature of 25° C. The result was 650 cps. A toluene cast film was prepared from this solution. The cast film was then measured for infrared absorption spectra. There were obserbed an absorption by the imide ring at 1,768 $cm^{-1}$ and 1,697 $cm^{-1}$ and an absorption by the formamide group at 1,664 $cm^{-1}$ (shoulder) and 1,530 $cm^{-1}$. The absorption due to p-toluenesulfonic acid at 1,100 $cm^{-1}$ and 580 $cm^{-1}$ disappeared. Further, there was observed an absorption due to the amino group at 3,434 $cm^{-1}$.

On the other hand, nuclear magnetic resonance spectra ($^{13}$C-NMR) measured with isotope carbon in CDCl$_3$ showed a peak corresponding to carbonyl carbon in the imide ring with an intensity ratio of 2.00 at 176 to 180 ppm and a peak corresponding to carbonyl carbon in the formamide group with an intensity ratio of 0.891 at 162 ppm but no peak indicating the presence of carbonyl carbon in the amide group at 172 to 174 ppm.

From the results of NMR spectra, the functional group proportions (molar proportion) ((III)+(IV))/(V) and —NH—CHO group/NH$_2$ group were determined to be 100/0 and 89/11, respectively.

EXAMPLE 2

In the same reaction vessel as used in Example 1 were charged 200 ml of DMF and 83.0 g of ethylenediamine hydrochloride. The mixture was heated to a temperature of 70° C. to make a solution. A solution of 100 g of an isobutyrene-maleic anhydride copolymer (NMP-2) (molar proportion: 50/50) (Mw: 9,000; Mn: 4,100) in 300 ml of a 1:1 (volumetric ratio) mixture of xylene and DMF was gradually added dropwise to the solution thus obtained.

The reaction solution was then heated to a temperature of 140° C. where the reaction was allowed to continue for 8 hours while water was removed by azetropy. The reaction mixture was concentrated to 400 ml under reduced pressure. The concentrate thus obtained was charged in 5 l of isopropanol. The resulting precipitate was dipped in 1,000 ml of a solution of 106 g of sodium carbonate in a 1:1 (volumetric ratio) mixture of water and isopropanol overnight, filtered off, thoroughly washed with water and isopropanol, and then dried. The yield was 137.8 g.

The copolymer thus obtained was a white powder which was then dissolved in a 1:1 (volumetric ratio) mixture of xylene and DMI in a proportion of 10% by weight. The solution was then measured for viscosity at a temperature of 25° C. The result was 45 cps.

The infrared absorption spectra (KBr tablet method) of the copolymer thus obtained (FAP-2) showed an absorption by the imide ring at 1,770 cm$^{-1}$ and 1,695 cm$^{-1}$, an absorption by the formamide group at 1,655 cm$^{-1}$ (shoulder) and 1,527 cm$^{-1}$, and an absorption by the amino group at 3,434 cm$^{-1}$.

On the other hand, nuclear magnetic resonance spectra ($^{13}$C-NMR) measured in DMSO-$^6$d showed a peak corresponding to carbonyl carbon in the imide ring with an intensity ratio of 2.00 at 176 to 180 ppm and a peak corresponding to carbonyl carbon in the formamide group with an intensity ratio of 0.643 at 162 ppm but no peak indicating the presence of carbonyl carbon in the amide group at 172 to 174 ppm.

From the results of NMR spectra, the functional group proportions (molar proportion) ((III)+(IV))/(V) and —NH—CHO group/NH$_2$ group were determined to be 100/0 and 64.3/35.7, respectively.

EXAMPLE 3

In the same reaction vessel as used in Example 1 were charged 120 g of a styrene-isoprene-maleic anhydride (molar proportion: 48/48/4) copolymer (NMP-3) (Mw: 40,000; Mn: 18,000) and 500 ml of xylene to make a solution. The solution thus obtained was heated to a temperature of 140° C. where a solution of 17.8 g of a reaction product of hexamethylenediamine with DMF as prepared in Reference Example 7 was added thereto under reflux of xylene.

The reaction was allowed to continue at a temperature of 140° C. for 5 hours while water produced by azetropy was continuously removed through the Dean-Stark water separator.

After completion of the reaction, the reaction mixture was cooled and then charged in 5 l of methanol. The product was then recovered as a precipitate.

The precipitate was washed with methanol and dried to obtain 123.2 g of a desired copolymer (FAP-3).

The copolymer thus obtained was a pale yellowish white powder soluble in toluene. The copolymer was dissolved in toluene in a proportion of 10% by weight and measured for viscosity by means of a B type viscometer at a temperature of 25° C. The result was 780 cps. A toluene cast film was prepared from this solution. The cast film was then measured for infrared absorption spectra. There were observed an absorption by the imide ring at 1,770 cm$^{-1}$ and 1,702 cm$^{-1}$ and an absorption by the formamide group at 1,660 cm$^{-1}$ (shoulder) and 1,531 cm$^{-1}$.

On the other hand, nuclear magnetic resonance spectra ($^{13}$C-NMR) measured in CDCl$_3$ showed a peak corresponding to carbonyl carbon in the imide ring with an intensity ratio of 2.00 at 176 to 180 ppm and a peak corresponding to carbonyl carbon in the formamide group with an intensity ratio of 1.00 at 162 ppm.

From the results of NMR spectra, the functional group proportions (molar proportion) ((III)+(IV))/(V) and —NH—CHO group/NH$_2$ group were determined to be 100/0 and 100/0, respectively.

EXAMPLE 4

In the same reaction vessel as used in Example 1 were charged 200 ml of DMF, 50.5 g of ethylenediamine hydrochloride obtained in Reference Example 2 and 200 ml of cumene. The mixture was heated to a temperature of 80° C. to make a solution. A solution of 70 g of a styrene-maleic anhydride copolymer (NMP-4) (molar proportion: 75/25) (Mw: 12,000; Mn: 5,000) in 200 ml of cumene was then gradually added dropwise to the solution through the dropping funnel.

The reaction solution was then heated to a temperature of about 153° C. where the reaction was allowed to continue for 9 hours, while removing water produced by azetropy through the Dean-Stark water separator. The resulting reaction mixture was charged in 5 l of isopropanol. The resulting precipitate was dipped in 1,000 ml of a solution of 54 g of sodium carbonate in a 2:1 (volumetric ratio) mixture of water and isopropanol overnight, filtered off, thoroughly washed with water and isopropanol, and then dried. The yield was 81.0 g.

The copolymer thus obtained (FAP-4) was a white powder which was then dissolved in xylene in a proportion of 10% by weight and measured for viscosity by means of a B type viscometer at a temperature of 25° C. The result was 110 cps.

The copolymer thus obtained was then measured for infrared absorption spectra (KBr tablet method). There were obserbed an absorption by the imide ring at 1,769 cm$^{-1}$ and 1,700 cm$^{-1}$, an absorption by the formamide group and amide group at 1,662 cm$^{-1}$ (shoulder) and 1,530 cm$^{-1}$, and an absorption by the amino group at 3,430 cm$^{-1}$.

On the other hand, nuclear magnetic resonance spectra ($^{13}$C-NMR) measured in CDCl$_3$ showed a peak corresponding to carbonyl carbon in the imide ring with an intensity ratio of 2.00 at 176 to 180 ppm, a peak corresponding to carbonyl carbon in the formamide group with an intensity ratio of 1.15 at 162 ppm, and a peak corresponding to carbonyl carbon in the amide group with an intensity ratio of 0.26 at 172 to 174 ppm.

From the results of NMR spectra, the functional group proportions (molar proportion) ((III)+(IV))/(V) and —NH—CHO group/NH$_2$ group were determined to be 79.4/20.6 and 91/9, respectively.

EXAMPLES 5 TO 10

Copolymers (FAP-5 to FAP-10) were prepared in the same manner as in Example 1 or 3, except that as a diamine salt or a reaction product of a diamine with a formyl group-containing compound there were used those obtained in Reference Examples 1 to 9 and as copolymers to be used as starting materials there were used copolymers (NMP-5 to NMP-10) as set forth in Table 3, respectively. The results are set forth in Table 3.

The copolymers thus obtained were similarly measured for viscosity. The results are set forth in Table 3.

TABLE 3

| | Copolymer as starting material | |
|---|---|---|
| | Kind | Amount (g) |
| Example 5 (FAP-5) | Ethylene-ethyl acrylate-maleic anhydride copolymer (NMP-5) (molar proportion: 88/10/2; Mw: 50,000; Mn: 20,000) | 100 |
| Example 6 (FAP-6) | Styrene-butadiene-maleic anhydride copolymer (NMP-6) (molar proportion: 50/48/2; Mw: 100,000; Mn: 40,000) | 100 |
| Example 7 (FAP-7) | Ethylene-propylene-maleic anhydride copolymer (NMP-7) (molar proportion: 70/28/2; Mw: 70,000; Mn: 34,000) | 83 |
| Example 8 (FAP-8) | Ethylene-ethyl acrylate-maleic anhydride copolymer (NMP-8) (molar proportion 90/5/5; Mw: 30,000; Mn: 13,000) | 71 |
| Example 9 (FAP-6) | Ethylene-vinyl acetate-maleic anhydride copolymer (NMP-9) (molar proportion: 95/4.5/0.5; Mw: 40,000; Mn: 18,000) | 100 |
| Example 10 (FAP-10) | Methyl vinyl ether-maleic anhydrid copolymer (NMP-10) (molar proportion: 50/50; Mw: 8,000 Mn: 3,900) | 47 |

| | Diamine salt or reaction product of diamine with formyl group-containing compound | |
|---|---|---|
| | Kind | Amount (g) |
| Example 5 | Hexamethylenediamine p-toluenesulfonate (Reference Example 3) | 28.5 |
| Example 6 | 1,3-Bis(aminomethyl)cyclohexanediamine p-toluenesulfonate (Reference Example 4) | 19.7 |
| Example 7 | m-Xylylenediamine p-toluenesulfonate (Reference Example 5) | 31.8 |
| Example 8 | Reaction product of 1,3-bis(aminomethyl)cyclohexanediamine with DMF (Reference Example 8) | 35.0 |
| Example 9 | Reaction product*[1] of m-xylylenediamine with formic acid (Reference Example 9) | 8.6 |
| Example 10 | Reaction product of ethylenediamine with formamide (Reference Example 6) | 36.3 |

*[1]1.5 g of triethylamine was used as a catalyst.

| | Reaction solvent | | | |
|---|---|---|---|---|
| | Solvent I | | Solvent II | |
| | Kind | Amount (ml) | Kind | Amount (ml) |
| Example 5 | DMF | 100 | Xylene | 400 |
| Example 6 | DMF | 80 | Xylene | 400 |
| Example 7 | DMF | 100 | Cumene | 400 |
| Example 8 | — | — | Xylene | 500 |
| Example 9 | Methylformamide | 40 | Xylene | 400 |
| Example 10 | DMF | 300 | Xylene | 300 |

| | Reaction conditions | | |
|---|---|---|---|
| | Temperature (°C.) | Time(hr.) | Yield (g) |
| Example 5 | 140 | 3 | 103.1 |
| Example 6 | 140 | 6 | 102.6 |
| Example 7 | 153 | 12 | 85.8 |
| Example 8 | 140 | 10 | 80.7 |
| Example 9 | 140 | 5 | 99.1 |
| Example 10 | 140 | 6 | 69.3 |

| | Viscosity of copolymer | | Color |
|---|---|---|---|
| | Measured | Measured Vis- | tone |

TABLE 3-continued

| | Solvent used | concentration (wt %) | temperature (°C.) | cosity (cps) | of copolymer |
|---|---|---|---|---|---|
| Example 5 | Xylene | 10 | 25 | 450 | White |
| Example 6 | Toluene | 10 | 25 | 1,480 | Pale yellow |
| Example 7 | Xylene | 10 | 25 | 980 | White |
| Example 8 | Xylene | 10 | 25 | 510 | White |
| Example 9 | Xylene | 10 | 25 | 390 | White |
| Example 10 | DMF | 10 | 25 | 85 | Pale yellow |

| | Infrared absorption spectra (cm$^{-1}$) | | $^{13}$C-NMR spectra (intensity ratio) | | |
|---|---|---|---|---|---|
| | | | W*[1] | Y*[2] | Z*[3] |
| Example 5 | 3440 | amino group | 2.00 | — | 0.36 |
| | 1772 | imide ring | | | |
| | 1705 | imide group | | | |
| | 1668 | shoulder | | | |
| | 1529 | formamide group | | | |
| Example 6 | 3438 | amino group | 2.00 | — | 0.63 |
| | 1775 | imide ring | | | |
| | 1702 | imide ring | | | |
| | 1667 | shoulder | | | |
| | 1530 | formamide group | | | |
| Example 7 | 3440 | amino group | 2.00 | 0.35 | 1.25 |
| | 1770 | imide ring | | | |
| | 1700 | imide ring | | | |
| | 1665 | shoulder | | | |
| | 1532 | formamide group, amide group | | | |
| Example 8 | 1775 | imide ring | 2.00 | — | 1.00 |
| | 1703 | imide ring | | | |
| | 1668 | shoulder | | | |
| | 1529 | formamide group | | | |
| Example 9 | 1780 | imide ring | 2.00 | 2.21 | 3.21 |
| | 1700 | imide ring | | | |
| | 1660 | shoulder | | | |
| | 1531 | formamide group, amide group | | | |
| Example 10 | 1779 | imide ring | 2.00 | — | 1.00 |
| | 1700 | imide ring | | | |
| | 1665 | shoulder | | | |
| | 1528 | formamide group, amide group | | | |

*[1]176 to 180 ppm;
*[2]172 to 174 ppm;
*[3]: 162 ppm

| | Functional group proportion | |
|---|---|---|
| | ((III) + (IV))/(V) | NHCHO/NH$_2$ |
| Example 5 | 100/0 | 36/64 |
| Example 6 | 100/0 | 63/37 |
| Example 7 | 74/26 | 93/7 |
| Example 8 | 100/0 | 100/0 |
| Example 9 | 31/69 | 100/0 |
| Example 10 | 100/0 | 100/0 |

EXAMPLE 11

11.2 g of the copolymer (FAP-4) obtained in Example 4 was dissolved in 100 ml of methanol. To the solution was added 50 g of 35% hydrochloric acid. The mixture was then subjected to uniform dispersion. The dispersion was allowed to stand at room temperature for 2 days. The reaction mixture was concentrated under reduced pressure and charged in 500 ml of isopropanol to obtain a precipitate. The precipitate thus obtained was dipped in 300 ml of a 1:1 (volumetric ratio) mixture of water and isopropanol containing 15.0 g of sodium carbonate overnight, filtered off, thoroughly washed with water and isopropanol, and then dried. The yield was 9.3 g.

The copolymer thus obtained (FAP-11) was a white powder which was then dissolved in xylene in a proportion of 10% by weight and measured for viscosity at a temperature of 25° C. The result was 135 cps.

The copolymer thus obtained was then measured for infrared absorption spectra (KBr tablet method). There were observed an absorption by the imide ring at 1,769 cm$^{-1}$ and 1,700 cm$^{-1}$, an absorption by the amide group at 1,655 cm$^{-1}$ (shoulder) and 1,530 cm$^{-1}$, and an absorption by the amino group at 3,430 cm$^{-1}$.

On the other hand, nuclear magnetic resonance spectra ($^{13}$C-NMR) measured in CDCl$_3$ showed a peak corresponding to carbonyl carbon in the imide ring with an intensity ratio of 2.00 at 176 to 180 ppm, no peak corresponding to carbonyl carbon in the formamide group at 162 ppm, and a peak corresponding to carbonyl carbon in the amide group with an intensity ratio of 0.25 at 172 to 174 ppm.

From the results of NMR spectra, the functional group proportions (molar proportion) ((III)+(IV))/(V) and —NH—CHO group/NH$_2$ group were determined to be 80/20 and 0/100, respectively.

COMPARATIVE EXAMPLE 1

A reaction was attempted to proceed in the same manner as in Example 1, except that 5.0 g of ethylenediamine was used instead of the ethylenediamine p-toluenesulfonate and that 300 ml of xylene was used instead of DMF. However, after completion of the dropwise addition of the styrene-maleic anhydride copolymer solution, when the azeotropy of water began during heating, the reaction mixture immediately showed too high a viscosity to be stirred and eventually became an integrated mass, disabling the continuance of the reaction.

The mass reaction mixture was partially recovered, washed with methanol, and then dried to obtain a specimen. Even when heated, this specimen was not dissolved in xylene. Thus, it was made clear that this product differed from the product obtained in Example 1. It was judged that this product comprised a crosslinked structure formed therein.

COMPARATIVE EXAMPLE 2

A reaction was attempted to proceed in the same manner as in Example 3, except that 15 g of hexamethylenediamine was used instead of the reaction product of hexamethylenediamine with DMF. However, when the hexamethylenediamine solution was added dropwise to the system in an amount of about one fourth, the reaction mixture showed too high a viscosity to be stirred, disabling the continuance of the reaction.

The reaction mixture was partially recovered, washed with methanol, and then dried to obtain a specimen. Even when heated, this specimen was not dissolved in xylene. Thus, it was made clear that this product differed from the product obtained in Example 3. It was judged that this product comprised a crosslinked structure formed therein.

COMPARATIVE EXAMPLE 3

A reaction was attempted to proceed in the same manner as in Example 2, except that 300 ml of DMI was used instead of DMF.

The copolymer (AMP-1) thus obtained was a brown powder which was then dissolved in xylene in a proportion of 10% by weight and measured for viscosity at a temperature of 25° C. The result was 680 cps.

The copolymer thus obtained was then measured for infrared absorption spectra (KBr tablet method). There were observed an absorption by the imide ring at 1,770 cm$^{-1}$ and 1,695 cm$^{-1}$ and an absorption by the amino group at 3,425 cm$^{-1}$.

REFERENCE EXAMPLE 10

(Preparation of maleic anhydride-grafted polypropylene: see JP-B-56-9925 (the term "JP-B" as used herein means an "examined Japanese patent publication"))

100 parts by weight of a crystalline polypropylene powder (NMP-11) with a weight-average molecular weight (Mw) of 60,000 and a number-average molecular weight (Mn) of 24,000, 12 parts by weight of maleic anhydride and 4 parts by weight of dicumyl peroxide were previously mixed. The mixture was then subjected to extrusion reaction in an extruder having a screw diameter of 30 mm and an L/D ratio of 28 at a barrel temperature of 230° C. and a screw revolution number of 60 rpm. The grafted compound was ground and dipped in acetone to extract away unreacted maleic anhydride. The residue was dried to obtain a maleic anhydride-grafted polypropylene resin (MMP-1). The amount of the maleic anhydride grafted was 4.5% by weight. The molecular weight of the product determined by gel permeation chromatography (GPC) was 15,000 (Mw) or 6,500 (Mn) as calculated in terms of polystyrene.

REFERENCE EXAMPLE 11

Maleic anhydride-grafted copolymers (MMP-2 to MMP-10) set forth in Table 4 were prepared in the same manner as in Reference Example 10, except that as copolymers to be used as starting materials there were used copolymers (NMP-12 to NMP-20) set forth in Table 4.

TABLE 4

| | Copolymers as starting materials Kind | Amount of maleic anhydride grafted (wt %) |
|---|---|---|
| MMP-2 | Hydrogenated product of styrene-butadiene copolymer (NMP-12) (weight ratio: 3/7; Mw: 50,000; Mn: 48,000) | 1.0 |
| MMP-3 | Ethylene-propylene copolymer (NMP-13) (weight ratio: 1/1; Mw: 11,800; Mn: 6,600) | 7.8 |
| MMP-4 | Ethylene-propylene copolymer (NMP-14) (weight ratio: 7/3; Mw: 90,000; Mn: 41,000) | 0.5 |
| MMP-5 | Polybutadiene (NMP-15) Mw: 30,000; Mn: 14,000) | 3.7 |
| MMP-6 | Polyethylene (NMP-16) (MW: 5,000; Mn: 2,200) | 20 |
| MMP-7 | Hydrogenated product of styrene-isoprene copolymer (NMP-17) (weight ratio: 3/7; Mw: 41,000; Mn: 18,200) | 3.1 |
| MMP-8 | Chloroprene rubber (NMP-18) (Mw: 30,000; Mn: 13,000) | 2.7 |
| MMP-9 | Nitrile rubber (NMP-19) (Mw: 34,000; Mn: 15,000) | 1.8 |
| MMP-10 | Ethylene-ethyl acrylate copolymer (NMP-20) (weight ratio: 17/3; Mw: 70,000; Mn: 32,000) | 4.5 |

EXAMPLE 12

In a 1-l capacity flask equipped with a thermometer, a stirrer, a dropping funnel and a Dean-Stark water separator were charged 300 ml of DMF and 120 g of maleic anhydride-grafted polypropylene (MMP-1) prepared in Reference Example 10. The mixture was heated to a temperature of 140° C. under reflux of xylene to make a solution.

A solution of 17.8 g of ethylenediamine p-toluenesulfonate prepared in Reference Example 1 in 200 ml of DMF was gradually added dropwise to the solution thus obtained in 3 hours. During this process, the reaction mixture was kept at the reflux temperature, and water produced by azeotropy as a result of the imidation reaction was removed from the reaction system through the Dean-Stark water separator.

The reaction was allowed to continue for 14 hours from the beginning of the dropwise addition of the above-mentioned ethylenediamine salt. The reaction mixture was cooled and charged in 5 l of methanol to obtain a purified product which was then recovered as a precipitate.

The precipitate was dissolved in toluene at an elevated temperature. A cast film was then prepared from this solution. The cast film was then measured for infrared absorption spectra. There were observed an absorption due to the imide ring at 1,768 cm$^{-1}$ and 1,700 cm$^{-1}$, an absorption due to the formamide group at 1,660 cm$^{-1}$ (shoulder) and 1,530 cm$^{-1}$, and an absorption due to p-toluenesulfonic acid at 1,122 cm$^{-1}$, 1,035 cm$^{-1}$, 1,010 cm$^{-1}$, 685 cm$^{-1}$ and 570 cm$^{-1}$. It was thus confirmed that a formamide group or a primary amino group was bonded to polypropylene via an imide bond in the form of p-toluenesulfonic acid.

Further, the precipitate was dipped in a 1:1 (volumetric ratio) mixture of water and methanol containing 8.0 g of potassium carbonate overnight, filtered off, thoroughly washed with water and methanol, and then dried. The yield was 121.1 g.

The copolymer thus obtained (FAP-12) was a pale yellowish white powder which was then dissolved in tetralin at a temperature of 100° C. in a proportion of 10% by weight and measured for viscosity by means of a B type viscometer at a temperature of 100° C. The result was 180 cps. A xylene cast film was prepared from this solution. The cast film was then measured for infrared absorption spectra. The absorption due to p-toluenesulfonic acid at 1,122 cm$^{-1}$, 1,035 cm$^{-1}$, 1,010 cm$^{-1}$, 685 cm$^{-1}$ and 570 cm$^{-1}$ disappeared. Further, there were observed an absorption by the imide ring at 1,768 cm$^{-1}$ and 1,700 cm$^{-1}$ and an absorption by the formamide group at 1,660 cm$^{-1}$ (shoulder) and 1,530 cm$^{-1}$. Moreover, there was observed an absorption due to the amino group at 3,400 cm$^{-1}$.

On the other hand, nuclear magnetic resonance spectra ($^{13}$C-NMR) measured with isotope carbon in CDCl$_3$ showed a peak corresponding to carbonyl carbon in the imide ring with an intensity ratio of 2.00 at 176 to 180 ppm and a peak corresponding to carbonyl carbon in the formamide group with an intensity ratio of 0.78 at 162 ppm but no peak indicating the presence of carbonyl carbon in the amide group at 172 to 174 ppm.

From the results of NMR spectra, the functional group proportions (molar proportion) ((III-A)+(IV-A))/(V-A) and —NH—CHO group/NH$_2$ group were determined to be 100/0 and 78/22, respectively.

EXAMPLE 13

In the sane reaction vessel as used in Example 12 was charged 50 g of a DMF solution containing 10.8 g of hexamethylenediamine p-toluenesulfonate prepared in Reference Example 3. The mixture heated to a temperature of 80° C.

A solution of 60 g of a maleic anhydride-modified product (MMP-2) (Mw: 50,000; Mn: 48,000; amount of maleic anhydride grafted: 1%) as the hydrogenated product of styrene-butadiene copolymer prepared in Reference Example 11 in 600 ml of xylene was gradually added dropwise to the reaction system through the dropping funnel. After completion of the dropwise addition, the reaction mixture was partially recovered for IR spectra. The absorption due to the succinic anhydride ring at 1,780 cm$^{-1}$ completely disappeared.

The reaction was allowed to continue at an elevated temperature of 140° C. for 8 hours while water produced by azeotropy was continuously removed through the Dean-Stark water separator until water was no longer produced.

After completion of the reaction, the reaction mixture was concentrated to 400 ml under reduced pressure. The concentrate was then charged in 5 l of a 1:1 (volumetric ratio) mixture of water and methanol containing 6.0 g of sodium carbonate to obtain a product which was then recovered as a precipitate.

The precipitate was washed with methanol and dried to obtain 59.1 g of a desired copolymer (FAP-13). The copolymer thus obtained was a pale yellowish white powder soluble in xylene. The copolymer was then dissolved in xylene in a proportion of 10% by weight and measured for viscosity by means of a B type viscometer at a temperature of 25° C. The result was 790 cps. A xylene cast film was prepared from the copolymer. The cast film was then measured for infrared absorption film. There were observed an absorption by the imide ring at 1,775 cm$^{-1}$ and 1,702 cm$^{-1}$, an absorption by the formamide group at 1,665 cm$^{-1}$ (shoulder) and 1,529 cm$^{-1}$, and an absorption (trace) due to the amino group at 3,420 cm$^{-1}$.

On the other hand, nuclear magnetic resonance spectra ($^{13}$C-NMR) measured in CDCl$_3$ showed a peak corresponding to carbonyl carbon in the imide ring with an intensity ratio of 2.00 at 176 to 180 ppm and a peak corresponding to carbonyl carbon in the formamide group with an intensity ratio of 0.65 ppm at 162 ppm.

From the results of NMR spectra, the functional group proportions (molar proportion) ((III-A)+(IV-A))/(V-A) and —NH—CHO group/NH$_2$ group were determined to be 100/0 and 65/35, respectively.

EXAMPLE 14

In the same reaction vessel as used in Example 12 were charged 90 g of a the maleic anhydride-grafted ethylene-propylene copolymer (MMP-3) prepared in Reference Example 11 and 500 ml of cumene to make a solution.

A solution of 17.7 g of ethylenediamine hydrochloride prepared in Reference Example 2 in 80 ml of DMF was added dropwise to the reaction solution at an elevated temperature of 153° C. under reflux of cumene.

The reaction was allowed to continue for 9 hours while water produced by azeotropy was continuously removed through the Dean-Stark water separator until water was no longer produced.

After completion of the reaction, the reaction mixture was then charged in 5 l of a 1:1 (volumetric ratio) mixture of water and methanol containing 10 g of sodium carbonate to obtain a product which was then recovered as a precipitate.

The precipitate was washed with methanol and dried to obtain 89.7 g of a desired copolymer (FAP-14). The copolymer thus obtained was a white powder soluble in xylene. The copolymer was then dissolved in xylene in a proportion of 10% by weight and measured for viscosity by means of a B type viscometer at a temperature of 25° C. The result was 350 cps. A xylene cast film was prepared from the copolymer. The cast film was then measured for infrared absorption film. There were observed an absorption of the imide ring at 1,775 cm$^{-1}$ and 1,700 cm$^{-1}$, an absorption by the formamide group at 1,670 cm$^{-1}$ (shoulder) and 1,529 cm$^{-1}$, and an absorption due to the amino group at 3,435 cm$^{-1}$.

On the other hand, nuclear magnetic resonance spectra ($^{13}$C-NMR) measured in CDCl$_3$ showed a peak corresponding to the carbonyl carbon in the imide ring with an intensity ratio of 2.00 at 176 to 180 ppm, a peak corresponding to carbonyl carbon in the formamide group with an intensity ratio of 1.09 ppm at 162 ppm, and a peak corresponding to carbonyl carbon in the amide group with an intensity of 0.22 at 172 to 174 ppm.

From the results of NMR spectra, the functional group proportions (molar proportion) ((III-A)+(IV-A))/(V-A) and —NH—CHO group/NH$_2$ group were determined to be 82/18 and 89/11, respectively.

EXAMPLE 15

A reaction was effected in the same manner as in Example 12, except that 120 g of the maleic anhydride-grafted polyethylene (MMP-6) prepared in Reference Example 11 was used instead of the maleic anhydride-grafted polypropylene copolymer and that 45.5 g of the reaction product of ethylenediamine with formamide prepared in Reference Example 6 was used instead of ethylenediamine p-toluenesulfonate.

As a result, 134.3 g of a desired copolymer (FAP-15) was obtained. The copolymer thus obtained was a white powder soluble in a mixture of tetralin and DMI. The copolymer was then dissolved in a 1:1 (volumetric ratio) mixture of tetralin and DMI in a proportion of 10% by weight and measured for viscosity by means of a B type viscometer at a temperature of 100° C. The result was 45 cps. The copolymer was then measured for infrared absorption spectra (KBr tablet method). There were observed an absorption by the imide ring at 1,780 cm$^{-1}$ and 1,772 cm$^{-1}$ and an absorption by the formamide group at 1,670 cm$^{-1}$ (shoulder) and 1,532 cm$^{-1}$.

On the other hand, nuclear magnetic resonance spectra ($^{13}$C-NMR) measured in CDCl$_3$ showed a peak corresponding to carbonyl carbon in the imide ring with an intensity ratio of 2.00 at 176 to 180 ppm and a peak corresponding to carbonyl carbon in the formamide group with an intensity ratio of 0.85 ppm at 162 ppm.

From the results of NMR spectra, the functional group proportions (molar proportion) ((III-A)+(IV-A))/(V-A) and —NH—CHO group/NH$_2$ group were determined to be 100/0 and 85/15, respectively.

EXAMPLES 16 TO 21

Reactions were effected in the same manner as in Examples 12 to 15 except that as the diamine salt or reaction product of a diamine with a formyl group-containing compound there were used those obtained in Reference Examples 1 to 9 and that as the copolymers to be used as starting materials there were used copolymers set forth in Reference Example 11. The results are set forth in Table 5.

The copolymers thus obtained were similarly measured for viscosity. The results are set forth in Table 5.

TABLE 5

| Copolymers as starting materials | | |
|---|---|---|
| | Kind | Amount (g) |
| Example 16 (FAP-16) | Maleic anhydride-grafted ethylene-propylene copolymer (MMP-4) | 120 |
| Example 17 (FAP-17) | Maleic anhydride-grafted polye butadiene copolymer (MMP-5) | 100 |
| Example 18 (FAP-18) | Maleic anhydride-grafted styrene-isoprene copolymer (MMP-7) | 100 |
| Example 19 (FAP-19) | Maleic anhydride-grafted chloroprene rubber (MMP-8) | 100 |
| Example 20 (FAP-20) | Maleic anhydride-grafted nitrile rubber (MMP-9) | 100 |
| Example 21 (FAP-21) | Maleic anhydride-grafted ethylene-ethyl acrylate copolymer (MMP-10) | 100 |

| Diamine salt or reaction product of diamine with formyl group-containing compound | | |
|---|---|---|
| | Kind | Amount (g) |
| Example 16 | Reaction product of hexamethylenediamine with DMF (Reference Example 7) | 4.0 |
| Example 17 | 1,3-Bis(aminomethyl)cyclohexane diamine-p-toluenesulfonate (Reference Example 4) | 19.5 |
| Example 18 | m-Xylylenediamine p-toluenesulfonate (Reference Example 5) | 20.0 |
| Example 19 | Reaction product of 1,3-bis(aminomethyl)cyclohexanediamine with DMF (Reference Example 8) | 10.8 |
| Example 20 | Product[*1] of the reaction of m-xylylenediamine with formic acid (Reference Example 9) | 10.0 |
| Example 21 | Reaction product of ethylenediamine with formamide (Reference Example 6) | 10.6 |

[*1] 2.0 g of triethylamine was used as a catalyst.

| | Reaction solvent | | | |
|---|---|---|---|---|
| | Solvent I | | Solvent II | |
| | Kind | Amount (ml) | Kind | Amount (ml) |
| Example 16 | | | Xylene | 600 |
| Example 17 | DMF | 100 | Xylene | 500 |
| Example 18 | DMF | 100 | Xylene | 500 |
| Example 19 | Methyl-formamide | 50 | Xylene | 400 |
| Example 20 | | | Xylene | 500 |
| Example 21 | DMF | 100 | Cumene | 400 |

| | Reaction conditions | | |
|---|---|---|---|
| | Temperature (°C.) | Time(hr.) | Yield (g) |
| Example 16 | 140 | 4 | 117.6 |
| Example 17 | 140 | 9 | 101.5 |
| Example 18 | 140 | 3 | 101.1 |
| Example 19 | 140 | 8 | 101.5 |
| Example 20 | 140 | 6 | 100.3 |
| Example 21 | 153 | 14 | 100.9 |

| | Viscosity of copolymer | | | | |
|---|---|---|---|---|---|
| | Solvent used | Measured concentration (wt %) | Measured temperature (°C.) | Viscosity (cps) | Color tone of copolymer |
| Example 16 | Xylene | 10 | 25 | 1,350 | White |
| Example 17 | Xylene | 10 | 25 | 410 | Pale yellow |
| Example 18 | Xylene | 10 | 25 | 625 | White |
| Example 19 | Xylene | 10 | 25 | 390 | Pale yellow |
| Example 20 | Xylene | 10 | 25 | 450 | Pale yellow |
| Example 21 | Xylene | 10 | 25 | 510 | White |

| | Infrared absorption spectra (cm$^{-1}$) | $^{13}$C-NMR spectra (intensity ratio) | | |
|---|---|---|---|---|
| | | W[*1] | Y[*2] | Z[*3] |
| Example 16 | 1772 imide ring<br>1702 imide ring<br>1672 shoulder<br>1529 formamide group | 2.00 | — | 1.00 |
| Example 17 | 3432 amino group<br>1778 imide ring | 2.00 | — | 0.81 |

TABLE 5-continued

| | | | | |
|---|---|---|---|---|
| Example 18 | 1702 imide ring<br>1667 shoulder<br>1531 formamide group<br>3450 amino group<br>1769 imide ring<br>1695 imide ring<br>1658 shoulder<br>1530 formamide group | 2.00 | — | 0.65 |
| Example 19 | 1775 imide ring<br>1700 imide ring<br>1665 shoulder<br>1531 formamide group | 2.00 | — | 1.00 |
| Example 20 | 1770 imide ring<br>1700 imide ring<br>1668 shoulder<br>1532 formamide group,<br>amide group | 2.00 | 2.57 | 3.57 |
| Example 21 | 1772 imide ring<br>1698 imide ring<br>1662 shoulder | 2.00 | 0.41 | 1.41 |

*[1] 176 to 180 ppm;
*[2] 172 to 174 ppm;
*[3] 162 ppm

| | Functional group proportion | |
|---|---|---|
| | ((III-A) + (IV-A))/(V-A) | NHCHO/NH$_2$ |
| Example 16 | 100/0 | 100/0 |
| Example 17 | 100/0 | 81/19 |
| Example 18 | 100/0 | 35/65 |
| Example 19 | 100/0 | 100/0 |
| Example 20 | 28/72 | 100/0 |
| Example 21 | 71/29 | 100/0 |

EXAMPLE 22

13.0 g of the copolymer obtained in Example 14 was dissolved in 100 ml of methanol. To the solution was added 50 g of 35% hydrochloric acid. The mixture was then subjected to uniform dispersion. The mixture was allowed to stand at room temperature for 2 days. The reaction mixture was concentrated under reduced pressure and charged in 500 ml of isopropanol to obtain a precipitate. The precipitate thus obtained was dipped in 300 ml of a 1:1 (volumetric ratio) mixture of water and isopropanol containing 5.0 g of sodium carbonate overnight, filtered off, thoroughly washed with water and isopropanol, and then dried. The yield was 12.1 g.

The copolymer thus obtained was a pale yellowish white powder which was then dissolved in toluene in a proportion of 10% by weight and measured for viscosity at a temperature of 25° C. The result was 395 cps.

A toluene cast film was prepared from the copolymer. The cast film was then measured for infrared absorption spectra. There were observed an absorption by the imide ring at 1,772 cm$^{-1}$ and 1,700 cm$^{-1}$, an absorption by the amide group at 1,666 cm$^{-1}$ (shoulder) and 1,530 cm$^{-1}$, and an absorption by the amino group at 3,430 cm$^{-1}$.

On the other hand, nuclear magnetic resonance spectra ($^{13}$C-NMR) measured in CDCl$_3$ showed a peak corresponding to carbonyl carbon in the imide ring with an intensity ratio of 2.00 at 176 to 180 ppm, no peak corresponding to carbonyl carbon in the formamide group at 162 ppm, and a peak corresponding to carbonyl carbon in the amide group with an intensity ratio of 0.20 at 172 to 174 ppm.

From the results of NMR spectra, the functional group proportions (molar proportion) (IV-A)/(V-A) and —NH—CHO group/NH$_2$ group were determined to be 83/17 and 0/100, respectively.

COMPARATIVE EXAMPLE 4

A reaction was attempted to proceed in the same manner as in Example 12, except that 5.0 g of the ethylenediamine was used instead of the ethylenediamine p-toluenesulfonate and that 200 ml of xylene was used instead of DMF. However, when the amount of a solution of 17.8 g of ethylenediamine p-toluenesulfonate in 200 ml of DMF added dropwise reached one fifth of the amount of the ethylenediamine solution, the reaction mixture immediately showed too high a viscosity to be stirred and eventually became an integrated mass, disabling the continuance of the reaction.

The mass reaction mixture was partially recovered, washed with methanol, and then dried to obtain a specimen. Even when heated, this specimen was not dissolved in xylene. Thus, it was made clear that this product differed from the product obtained in Example 12. It was judged that this product comprised a crosslinked structure formed therein.

COMPARATIVE EXAMPLE 5

In the same reaction vessel as used in Example 12 were charged 800 ml of xylene and 16.5 g of ethylenediamine. The mixtre was heated to a temperature of 100° C. 120 g of the maleic anhydride-grafted polypropylene obtained in Reference Example 10 was added to the reaction system in the form of a powder. The reaction system continued to be heated. However, when the azeotropy of water began, the reaction mixture immediately showed too high a viscosity to be stirred and eventually became an integrated mass, disabling the continuance of the reaction.

The mass reaction mixture was partially recovered, washed with methanol, and then dried to obtain a specimen. Even when heated, this specimen was not dissolved in xylene. Thus, it was made clear that this product differed from the product obtained in Example 12. it was judged that this product comprised a crosslinked structure formed therein.

COMPARATIVE EXAMPLE 6

A reaction was attempted to proceed in the same manner as in Example 13, except that 4.5 g of hexaethylenediamine was used instead of the ethylenediamine p-toluenesulfonate and that 150 ml of xylene was used instead of DMF. However, after completion of the dropwise addition of a solution of 60 g of a maleic anhydride-modified product (MMP-2) (Mw: 50,000; Mn: 48,000; amount of maleic anhydride grafted: 1%) as the hydrogenated product of styrenebutadiene copolymer in 600 ml of xylene, when the distillation of water by azeotropy began during heating, the reaction mixture immediately showed too high a viscosity to be stirred and eventually became an integrated mass, disabling the continuance of the reaction.

The mass reaction mixture was partially recovered, washed with methanol, and then dried to obtain a specimen. Even when heated, this specimen was not dissolved in xylene. Thus, it was made clear that this product differed from the product obtained in Example 13. It was judged that this product comprised a crosslinked structure formed therein.

COMPARATIVE EXAMPLE 7

A reaction was attempted to proceed in the same manner as in Example 12, except that 200 ml of DMI was used instead of DMF. The copolymer thus obtained was a brown powder soluble in xylene. The copolymer was then dissolved in tetralin in a proportion of 10% by weight for the measurement of viscosity at a temperature of 100° C. The result was 165 cps.

A xylene cast film was prepared from the copolymer for the measurement of IR spectra. There were observed an absorption by the imide ring at 1,770 cm$^{-1}$ and 1,700 cm$^{-1}$ and an absorption by the amino group at 3,350 cm$^{-1}$.

EXAMPLES 23 TO 75 & COMPARATIVE EXAMPLES 8 TO 61

Predetermined components (i) and (ii) set forth in Tables 6 and 7 and components (iii) consisting of the above-mentioned amino-modified product or acid copolymer were dry-blended, thoroughly dried, and then thoroughly kneaded by means of an NVC single screw-extruder (produced by Nakatani Kikai K. K.) with a vent. The mixture was then molded by a Type IS100EN injection molding machine (produced by Toshiba Machine Co., Ltd.) to prepare test pieces.

Using the test pieces thus obtained, various physical properties were evaluated in accordance with the following methods. The results are set forth in Table 8.
(1) Izod impact test: effected in accordance with JIS-K-7110 (Conditions) temperature: 23° C.,−30° C.; notched; n=5
(2) Face impact test: An automatic falling weight impact test was effected to determine fracture condition and fracture energy.

(Method) A 80×80×3 mm injection-molded plate was fixed to a specimen clamping plate having a hole with a diameter of 2 inch in such an arrangement that the center of the injection-molded plate met the center of the hole of the specimen clamping plate. Under the conditions described below, a displacement curve with respect to the force was determined. From the displacement curve, the area up to the displacement point at which the force showed a rapid drop was determined as a fracture energy [J]. After completion of the test, the fracture condition was observed to evaluate if the specimen was ductile (D), slightly ductile, slightly brittle (B') or brittle (B).

(Condition) temperature: −10° C.; load of weight: 3.75 kg; speed of weight: 7.0 m/sec.; n=5; The tester used was RDT5000 (produced by Rheometrix Corp.).
(3) Peelability: effected in accordance with cross-cut peel test method (Method) A 80×80×3 mm injection-molded plate (prepared with a constant injection time and filling time) was notched with a sharp cutter blade in a 10×10 mm square on the center portion thereof so as to give 100 squares having a size of 1×1 mm. A cellophane adhesive tape was then strongly put onto these squares. The cellophane adhesive tape was suddenly peeled off the plate at an angle of 45°. The percent remaining was defined below. This test was effected 5 times for each specimen. The measurements were then averaged for evaluation of peelability.

(Percent remaining)=(remaining number of 1×1 mm squares)/100
(4) External appearance: Poor appearances such as flow mark, stripe pattern, fluffing and silver blister were visually evaluated. Criterion: E (Good); F (slightly poor); P (poor)

TABLE 6

| Abbreviation | (resin as component (i)) Name of resin | Grade |
| --- | --- | --- |
| PC-1 | Polycarbonate | A2200[*2] |
| PC-2 | Polycarbonate | A2500[*3] |
| PC-3 | Polyarylate | U100T[*4] |
| PET-1 | Polyethylene terephthalate | PA200[*5] |
| PBT-1 | Polybutylene terephthalate | N1000[*6] |
| PA-1 | Polyamide-6 | 1013[*7] |
| PA-2[*1] | Polyamide-6 | 1012C[*8] |
| PA-3 | Polyamide-6,6 | CM3007[*9] |
| POM-1 | Polyoxymethylene | M25[*10] |
| PPE-1 | Polyphenylene ether | SE100J[*11] |

[*1] Abundantly terminated with carboxylic acid; the ratio of carboxylic acid to amino group at end is 9:1
[*2] Tuflon, produced by Idemitsu Petrochemical Co., Ltd.
[*3] Tuflon, produced by Idemitsu Petrochemical Co., Ltd.
[*4] U Polymer, produced by Unitika Ltd.
[*5] Dianite, produced by Mitsubishi Rayon Co., Ltd.
[*6] Tufpet, produced by Mitsubishi Rayon Co., Ltd.
[*7] Ube Nylon, produced by Ube Industries, Ltd.
[*8] Ube Nylon, produced by Ube Industris, Ltd.
[*9] Alamine, produced by Toray Industries, Inc.
[*10] Duracon, produced by Polyplastics Co., Ltd.
[*11] Noryl, produced by Nippon GE Plastics K. K.

TABLE 7

| Abbreviation | (resin as component (ii)) Name of resin | Grade |
| --- | --- | --- |
| PP-1 | Polypropylene | J-465H[*12] |
| PP-2 | Polypropylene | J-609H[*13] |
| PP-3 | Polypropylene | E100G[*14] |
| PE-1 | Polyethylene | 750LB[*15] |
| EP-1 | Ethylene-propylene rubber | EP912P[*16] |
| PS-1 | General purpose polystyrene | US300[*17] |
| PS-2 | High impact polystyrene | HT52[*18] |
| ABS-1 | ABS resin | DP611[*19] |
| AS-1 | AS resin | 290SF[*20] |
| SMA-1 | Styrene-maleic anhydride copolymer | UG830[*21] |

[*12] Idemitsu Polypro, block polypropylene produced by Idemitsu Petrochemical Co., Ltd.
[*13] Ube Polypro, block polypropylene produced by Ube Industriesg Ltd.
[*14] Idemitsu Polypro, homopolypropylene produced by Idemitsu Petrochemical Co., Ltd.
[*15] Idemitsu Polyethylene, produced by Idemitsu Petrochemical Co., Ltd.
[*16] JSR EP, produced by JSR
[*17] Idemitsu Styrol, GPPS produced by Idemitsu Petrochemical Co., Ltd.
[*18] Idemitsu Styrol, HIPS produced by Idemitsu Petrochemical Co., Ltd.
[*19] JSR ABS, produced by JSR
[*20] JSR AS, produced by JSR
[*21] Moremax, produced by Idemitsu Petrochemical Co., Ltd.

TABLE 8

| | Resin formulations | | |
| --- | --- | --- | --- |
| | Component (i) (wt. %)[*a] | Component (ii) (wt. %)[*a] | Component (iii) (wt. %)[*b] |
| Example 23 | PC-1 (90) | PP-1 (10) | FAP-2 (2) |
| Example 24 | PC-1 (70) | PP-1 (30) | FAP-5 (5) |
| Example 25 | PC-1 (30) | PP-1 (70) | FAP-6 (5) |
| Example 26 | PC-1 (10) | PP-2 (90) | FAP-9 (10) |
| Example 27 | PC-2 (5) | PP-3 (95) | FAP-1 (5) |
| Comparative Example 8 | PC-1 (90) | PP-1 (10) | — (—) |
| Comparative Example 9 | PC-1 (70) | PP-1 (30) | NMP-5 (5) |
| Comparative Example 10 | PC-1 (30) | PP-1 (70) | NMP-6 (5) |
| Comparative Example 11 | PC-1 (10) | PP-2 (90) | NMP-8 (10) |
| Comparative Example 12 | PC-2 (5) | PP-3 (95) | NMP-1 (5) |
| Example 28 | PC-1 (70) | PE-1 (30) | FAP-7 (5) |
| Example 29 | PC-3 (30) | PE-1 (70) | FAP-10 (2) |
| Example 30 | PC-1 (95) | EP-1 (5) | FAP-7 (5) |
| Comparative Example 13 | PC-1 (70) | PE-1 (30) | NMP-7 (5) |
| Comparative Example 14 | PC-3 (30) | PE-1 (70) | NMP-10 (2) |
| Comparative Example 15 | PC-3 (30) | PE-1 (70) | FAP-10 (25) |

TABLE 8-continued

| | | | |
|---|---|---|---|
| Comparative Example 16 | PC-1 (95) | EP-1 (5) | EP-1 (5) |
| Example 31 | PC-1 (70) | PS-1 (30) | FAP-6 (2) |
| Example 32 | PC-1 (30) | ABS-1 (70) | FAP-1 (5) |
| Example 33 | PC-3 (50) | ABS-1 (50) | FAP-3 (5) |
| Example 34 | PC-2 (70) | SMA-1 (30) | FAP-4 (5) |
| Comparative Example 17 | PC-1 (70) | PS-1 (30) | — |
| Comparative Example 18 | PC-1 (30) | ABS-1 (70) | AMP-1 (5) |
| Comparative Example 19 | PC-3 (50) | ABS-1 (50) | NMP-3 (5) |
| Comparative Example 20 | PC-2 (70) | SMA-1 (30) | SMA-1 (5) |
| Example 35 | PBT-1 (70) | PE-1 (30) | FAP-9 (5) |
| Example 36 | PET-1 (95) | EP-1 (5) | FAP-7 (2) |
| Example 37 | PBT-1 (50) | ABS-1 (50) | FAP-4 (10) |
| Example 38 | PET-1 (70) | ABS-1 (30) | FAP-3 (5) |
| Example 39 | PBT-1 (70) | PS-2 (30) | FAP-6 (5) |
| Comparative Example 21 | PBT-1 (70) | PE-1 (30) | NMP-9 (5) |
| Comparative Example 22 | PET-1 (95) | EP-1 (5) | — |
| Comparative Example 23 | PBT-1 (50) | ABS-1 (50) | NMP-4 (10) |
| Comparative Example 24 | PET-1 (70) | ABS-1 (30) | — |
| Comparative Example 25 | PBT-1 (70) | PS-2 (30) | NMP-6 (5) |
| Example 40 | PA-1 (90) | EP-1 (10) | FAP-7 (5) |
| Example 41 | PA-1 (70) | ABS-1 (30) | FAP-6 (5) |
| Example 42 | PA-2 (70) | ABS-1 (30) | FAP-6 (5) |
| Example 43 | PA-3 (70) | SMA-1 (30) | FAP-1 (2) |
| Comparative Example 26 | PA-1 (90) | EP-1 (10) | EP-1 (5) |
| Comparative Example 27 | PA-1 (70) | ABS-1 (30) | — |
| Comparative Example 28 | PA-3 (70) | SMA-1 (30) | AMP-1 (10) |
| Example 44 | POM-1 (95) | EP-1 (5) | FAP-7 (2) |
| Example 45 | PPE-1 (70) | PP-1 (30) | FAP-8 (5) |
| Example 46 | PPE-1 (50) | ABS-1 (50) | FAP-4 (7) |
| Comparative Example 29 | POM-1 (95) | EP-1 (5) | — |
| Comparative Example 30 | PPE-1 (70) | PP-1 (30) | NMP-8 (5) |
| Comparative Example 31 | PPE-1 (50) | ABS-1 (50) | NMP-4 (7) |
| Example 47 | PC-1 (90) | PP-1 (10) | FAP-13 (2) |
| Example 48 | PC-1 (70) | PP-1 (30) | FAP-12 (5) |
| Example 49 | PC-1 (30) | PP-1 (70) | FAP-13 (5) |
| Example 50 | PC-1 (10) | PP-1 (90) | FAP-21 (10) |
| Example 51 | PC-2 (5) | PP-2 (95) | FAP-18 (5) |
| Comparative Example 32 | PC-1 (90) | PP-1 (10) | NMP-12 (2) |
| Comparative Example 33 | PC-1 (70) | PP-1 (30) | — |
| Comparative Example 34 | PC-1 (70) | PP-1 (30) | AMP-1 (5) |
| Comparative Example 35 | PC-1 (30) | PP-1 (70) | BP-1 (5) |
| Comparative Example 36 | PC-1 (10) | PP-1 (90) | NMP-20 (10) |
| Example 52 | PC-1 (70) | PE-1 (30) | FAP-15 (5) |
| Example 53 | PC-1 (30) | PE-1 (70) | FAP-17 (2) |
| Example 54 | PC-1 (95) | EP-1 (5) | FAP-16 (5) |
| Comparative Example 37 | PC-2 (5) | PP-2 (95) | NMP-17 (5) |
| Comparative Example 38 | PC-1 (70) | PE-1 (30) | — |
| Comparative Example 39 | PC-1 (30) | PE-1 (70) | NMP-16 (2) |
| Comparative Example 40 | PC-1 (95) | EP-1 (5) | NMP-15 (5) |
| Example 55 | PC-3 (70) | ABS-1 (30) | FAP-18 (5) |
| Example 56 | PC-1 (70) | ABS-1 (30) | FAP-13 (5) |
| Example 57 | PC-1 (90) | PS-1 (10) | FAP-13 (5) |
| Example 58 | PC-1 (30) | AS-1 (70) | FAP-20 (10) |
| Comparative Example 41 | PC-3 (70) | ABS-1 (30) | MMP-7 (5) |
| Comparative Example 42 | PC-1 (70) | ABS-1 (30) | — |
| Comparative Example 43 | PC-1 (90) | PS-1 (10) | — |
| Comparative Example 44 | PC-1 (30) | AS-1 (70) | MMP-9 (10) |
| Example 59 | PC-2 (70) | SMA-1 (30) | FAP-13 (2) |
| Example 60 | PET-1 (50) | PE-1 (50) | FAP-18 (5) |
| Example 61 | PBT-1 (30) | PP-1 (70) | FAP-12 (2) |
| Example 62 | PET-1 (90) | EP-1 (10) | FAP-16 (2) |
| Example 63 | PET-1 (30) | SMA-1 (70) | FAP-21 (5) |
| Comparative Example 45 | PC-2 (70) | SMA-1 (30) | MMP-2 (2) |
| Comparative Example 46 | PET-1 (50) | PE-1 (50) | MMP-7 (5) |
| Comparative Example 47 | PBT-1 (30) | PP-3 (70) | AMP-1 (2) |
| Comparative Example 48 | PET-1 (90) | EP-1 (10) | — |
| Comparative Example 49 | PET-1 (30) | SMA-1 (70) | MMP-20 (5) |
| Example 64 | PBT-1 (50) | ABS-1 (50) | FAP-13 (5) |
| Example 65 | PA-1 (30) | PP-1 (70) | FAP-12 (5) |
| Example 66 | PA-1 (70) | PE-1 (30) | FAP-15 (5) |
| Example 67 | PA-1 (70) | PE-1 (30) | FAP-15 (5) |
| Comparative Example 50 | PBT-1 (50) | ABS-1 (50) | NMP-2 (5) |
| Comparative Example 51 | PA-1 (30) | PP-2 (70) | FAP-12 (25) |
| Comparative Example 52 | PA-1 (30) | PP-2 (70) | PP-2 (25) |
| Example 68 | PA-3 (90) | EP-1 (10) | FAP-16 (2) |
| Example 69 | PA-3 (30) | ABS-1 (70) | FAP-18 (2) |
| Example 70 | PA-1 (90) | PS-2 (10) | FAP-18 (10) |
| Comparative Example 53 | PA-1 (70) | EP-1 (30) | — |
| Comparative Example 54 | PA-3 (90) | EP-1 (10) | — |
| Comparative Example 55 | PA-1 (30) | ABS-1 (70) | NMP-14 (2) |
| Example 71 | PA-1 (70) | SMA-1 (30) | FAP-13 (5) |
| Example 72 | POM-1 (95) | EP-1 (5) | FAP-14 (5) |
| Example 73 | PPE-1 (30) | PE-1 (70) | FAP-14 (5) |
| Example 74 | PPE-1 (70) | ABS-1 (30) | FAP-13 (5) |
| Example 75 | PPE-1 (70) | SMA-1 (30) | FAP-18 (5) |
| Comparative Example 56 | PA-3 (90) | PS-2 (10) | MMP-7 (10) |
| Comparative Example 57 | PA-1 (70) | SMA-1 (30) | NMP-12 (5) |
| Comparative Example 58 | POM-1 (95) | EP-1 (5) | MMP-3 (5) |
| Comparative Example 59 | PPE-1 (30) | PE-1 (70) | — |
| Comparative Example 60 | PPE-1 (70) | ABS-1 (30) | MMP-2 (5) |
| Comparative Example 61 | PPE-13 (70) | SMA-1 (30) | NMP-17 (5) |

| | Physical properties | | |
|---|---|---|---|
| | Impact Strength[*c] | | Color |
| | 23° C. | −30° C. | tone |
| Example 23 | 70.3 | 43.4 | White |
| Example 24 | 63.2 | 40.4 | White |
| Example 25 | 42.7 | 30.0 | White |
| Example 26 | 37.4 | 19.7 | White |
| Example 27 | 26.3 | 12.4 | White |
| Comparative Example 8 | 53.2 | 8.8 | White |
| Comparative Example 9 | 22.4 | 10.3 | White |
| Comparative Example 10 | 13.2 | 7.1 | White |
| Comparative Example 11 | 14.1 | 8.9 | White |
| Comparative Example 12 | 7.2 | 2.1 | White |
| Example 28 | 58.1 | 22.8 | White |
| Example 29 | 17.3 | 7.9 | Pale brown |
| Example 30 | 75.4 | 42.1 | White |
| Comparative Example 13 | 18.7 | 12.0 | White |
| Comparative Example 14 | 6.4 | 1.1 | Pale brown |
| Comparative | 10.4 | 4.1 | Pale brown |

TABLE 8-continued

| | | | |
|---|---|---|---|
| Example 15 | | | |
| Comparative Example 16 | 76.9 | 27.3 | White |
| Example 31 | 30.2 | 20.9 | White |
| Example 32 | N.B. | 48.6 | Pale yellow |
| Example 33 | 44.9 | 27.1 | Pale yellow |
| Example 34*e | 80 or more | 48.2 | White |
| Comparative Example 17 | 8.2 | 2.3 | White |
| Comparative Example 18 | 15.2 | 8.0 | Brown |
| Comparative Example 19 | 30.3 | 9.9 | Pale yellow |
| Comparative Example 20*h | 80 or more | 20.3 | White |
| Example 35 | 40.7 | 26.3 | White |
| Example 36 | 37.6 | 28.5 | White |
| Example 37 | 52.3 | 27.8 | Pale yellow |
| Example 38 | 30.8 | 20.1 | Pale yellow |
| Example 39 | 25.2 | 14.0 | White |
| Comparative Example 21 | 7.6 | 3.2 | White |
| Comparative Example 22 | 13.2 | 6.3 | White |
| Comparative Example 23 | 7.9 | 2.2 | Pale brown |
| Comparative Example 24 | 6.3 | 2.2 | Pale brown |
| Comparative Example 25 | 8.3 | 3.5 | White |
| Example 40 | 54.3 | 27.6 | White |
| Example 41 | 57.4 | 40.8 | Pale yellow |
| Example 42 | 62.7 | 44.3 | Pale yellow |
| Example 43 | 37.8 | 19.6 | White |
| Comparative Example 26 | 29.3 | 10.4 | White |
| Comparative Example 27 | 19.9 | 8.7 | Pale yellow |
| Comparative Example 28 | 38.4 | 18.3 | Brown |
| Example 44 | 24.8 | 15.2 | White |
| Example 45 | 32.3 | 16.2 | Pale yellow |
| Example 46 | 43.7 | 23.4 | Pale yellow |
| Comparative Example 29 | 8.6 | 3.2 | White |
| Comparative Example 30 | 10.4 | 4.2 | Pale yellow |
| Comparative Example 31 | 20.0 | 12.3 | Pale yellow |
| Example 47 | 76.5 | 42.5 | White |
| Example 48 | 62.8 | 40.1 | White |
| Example 49 | 42.3 | 27.6 | White |
| Example 50 | 41.9 | 23.3 | White |
| Example 51 | 15.9 | 9.8 | Pale yellow |
| Comparative Example 32 | 34.0 | 5.3 | White |
| Comparative Example 33 | 5.3 | 3.1 | White |
| Comparative Example 34 | 60.4 | 40.2 | Pale brown |
| Comparative Example 35 | 36.5 | 12.3 | White |
| Comparative Example 36 | 22.4 | 7.3 | White |
| Example 52 | 50.5 | 24.8 | White |
| Example 53 | 32.3 | 20.4 | White |
| Example 54 | 72.6 | 40.3 | White |
| Comparative Example 37 | 72.6 | 40.3 | Pale yellow |
| Comparative Example 38 | 4.7 | 1.5 | White |
| Comparative Example 39 | 12.7 | 7.6 | White |
| Comparative Example 40 | 50.2 | 14.5 | White |
| Example 55 | 36.8 | 19.7 | Pale yellow |
| Example 56 | 69.6 | 40.0 | Pale yellow |
| Example 57 | 34.3 | 20.8 | White |
| Example 58 | 23.8 | 12.4 | Pale yellow |
| Comparative Example 41 | 20.6 | 8.9 | Pale yellow |
| Comparative Example 42 | 62.4 | 37.3 | Pale yellow |
| Comparative Example 43 | 24.2 | 14.3 | White |
| Comparative Example 44 | 13.1 | 3.2 | Pale yellow |
| Example 59 | 37.9 | 24.3 | White |
| Example 60 | 39.7 | 25.4 | White |
| Example 61 | 33.7 | 14.8 | White |
| Example 62 | 40.3 | 23.0 | White |
| Example 63 | 23.6 | 13.5 | White |
| Comparative Example 45 | 15.4 | 5.3 | White |
| Comparative Example 46 | 13.2 | 6.3 | White |
| Comparative Example 47 | 36.7 | 15.0 | Pale brown |
| Comparative Example 48 | 20.9 | 7.4 | White |
| Comparative Example 49 | 10.3 | 2.3 | White |
| Example 64 | 60.4 | 23.6 | Pale yellow |
| Example 65 | 32.7 | 19.9 | White |
| Example 66 | 64.2 | 30.9 | White |
| Example 67 | 70.8 | 34.6 | White |
| Comparative Example 50 | 52.4 | 13.1 | Pale yellow |
| Comparative Example 51 | 23.5 | 10.4 | White |
| Comparative Example 52 | 8.9 | 2.1 | White |
| Example 68 | 54.9 | 31.2 | White |
| Example 69 | 62.5 | 43.1 | Pale yellow |
| Example 70 | 35.6 | 17.7 | White |
| Comparative Example 53 | 5.8 | 2.6 | White |
| Comparative Example 54 | 26.4 | 7.3 | White |
| Comparative Example 55 | 30.4 | 17.5 | Pale yellow |
| Example 71 | 33.8 | 20.0 | White |
| Example 72 | 25.6 | 14.2 | White |
| Example 73 | 23.8 | 14.5 | Pale yellow |
| Example 74 | 40.5 | 26.3 | Pale yellow |
| Example 75 | 23.9 | 13.6 | Pale yellow |
| Comparative Example 56 | 23.2 | 12.3 | White |
| Comparative Example 57 | 20.1 | 8.8 | While |
| Comparative Example 58 | 13.6 | 6.3 | White |
| Comparative Example 59 | 8.9 | 2.0 | Pale yellow |
| Comparative Example 60 | 26.3 | 10.1 | Pale yellow |
| Comparative Example 61 | 17.3 | 8.0 | Pale yellow |

| | Physical properties | | | |
|---|---|---|---|---|
| | Face impact strength*c | | Peel-ability*i | External appear-ance*j |
| | Fracture condition | Fracture energy (J) | | |
| Example 23 | D | 34 | 100/100 | E |
| Example 24 | D | 27 | 100/100 | E |
| Example 25 | D | 23 | 100/100 | E |
| Example 26 | D' | 15 | 100/100 | E |
| Example 27*e | B' | 9 | 100/100 | E |
| Comparative Example 8 | B | 5 | 70/100 | P |
| Comparative Example 9 | B | 1 | 37/100 | P |
| Comparative Example 10 | B | 2 | 17/100 | P |
| Comparative Example 11 | B | 3 | 33/100 | P |
| Comparative Example 12 | B | 1 | 100/100 | P |
| Example 28 | D | 23 | 100/100 | E |
| Example 29 | B' | 8 | 77/100 | E |
| Example 30 | D | 35 | 100/100 | E |
| Comparative Example 13 | B' | 4 | 20/100 | P |
| Comparative | B | 1 | 0/100 | P |

TABLE 8-continued

| | | | | |
|---|---|---|---|---|
| Example 14 | | | | |
| Comparative Example 15 | B | 4 | 100/100 | F |
| Comparative Example 16 | D' | 13 | 100/100 | E |
| Example 31 | D' | 22 | 100/100 | E |
| Example 32 | D | 26 | 100/100 | E |
| Example 33 | D' | 20 | 100/100 | E |
| Example 34 | D | 50 | 100/100 | E |
| Comparative Example 17 | B | 1 | 35/100 | F |
| Comparative Example 18 | B | 3 | 65/100 | E |
| Comparative Example 19 | B | 4 | 40/100 | E |
| Comparative Example 20 | D | 34 | 100/100 | E |
| Example 35 | D | 20 | 100/100 | E |
| Example 36 | D' | 18 | 100/100 | E |
| Example 37 | D | 22 | 100/100 | E |
| Example 38 | D' | 15 | 100/100 | E |
| Example 39 | D' | 12 | 100/100 | E |
| Comparative Example 21 | B | 2 | 19/100 | E |
| Comparative Example 22 | B | 3 | 100/100 | E |
| Comparative Example 23 | B | 3 | 52/100 | E |
| Comparative Example 24 | B | 4 | 79/100 | E |
| Comparative Example 25 | B | 3 | 95/100 | E |
| Example 40 | D | 25 | 100/100 | E |
| Example 41 | D | 27 | 100/100 | E |
| Example 42 | D | 30 | 100/100 | E |
| Example 43 | D' | 14 | 100/100 | E |
| Comparative Example 26 | B' | 8 | 100/100 | E |
| Comparative Example 27 | B' | 5 | 65/100 | E |
| Comparative Example 28 | D' | 12 | 100/100 | E |
| Example 44 | B' | 10 | 100/100 | E |
| Example 45 | D' | 14 | 100/100 | E |
| Example 46 | D' | 24 | 100/100 | E |
| Comparative Example 29 | B | 1 | 100/100 | E |
| Comparative Example 30 | B | 3 | 23/100 | E |
| Comparative Example 31 | B' | 8 | 38/100 | E |
| Example 47 | D | 33 | 100/100 | E |
| Example 48 | D | 28 | 100/100 | E |
| Example 49 | D' | 22 | 100/100 | E |
| Example 50 | D' | 20 | 80/100 | E |
| Example 51 | B' | 8 | 74/100 | E |
| Comparative Example 32 | B | 4 | 63/100 | F |
| Comparative Example 33 | B | 1 | 10/100 | P |
| Comparative Example 34 | D | 30 | 100/100 | E |
| Comparative Example 35 | B' | 5 | 6/100 | P |
| Comparative Example 36 | B | 2 | 2/100 | P |
| Example 52 | D | 25 | 100/100 | E |
| Example 53 | D | 22 | 100/100 | E |
| Example 54 | D | 34 | 100/100 | E |
| Comparative Example 37 | B | 3 | 4/100 | E |
| Comparative Example 38 | B | 1 | 7/100 | P |
| Comparative Example 39 | B' | 4 | 12/100 | P |
| Comparative Example 40 | D' | 13 | 100/100 | E |
| Example 55*,f | D' | 20 | 100/100 | E |
| Example 56 | D | 25 | 100/100 | E |
| Example 57 | D' | 23 | 100/100 | E |
| Example 58 | B' | 10 | 100/100 | E |
| Comparative Example 41 | B | 3 | 76/100 | F |
| Comparative Example 42 | D' | 19 | 75/100 | E |
| Comparative Example 43 | B' | 4 | 100/100 | F |
| Comparative Example 44 | B | 3 | 100/100 | F |
| Example 59 | D | 25 | 100/100 | E |
| Example 60 | D' | 20 | 100/100 | E |
| Example 61 | D' | 15 | 100/100 | E |
| Example 62 | D | 23 | 100/100 | E |
| Example 63 | B' | 6 | 100/100 | F |
| Comparative Example 45 | B | 2 | 100/100 | F |
| Comparative Example 46 | B' | 4 | 35/100 | F |
| Comparative Example 47 | D' | 16 | 100/100 | E |
| Comparative Example 48 | B' | 7 | 100/100 | F |
| Comparative Example 49 | B | 2 | 19/100 | P |
| Example 64 | D | 26 | 100/100 | E |
| Example 65 | D' | 19 | 100/100 | E |
| Example 66 | D | 28 | 100/100 | E |
| Example 67 | D | 27 | 100/100 | E |
| Comparative Example 50 | D' | 13 | 100/100 | E |
| Comparative Example 51 | B | 3 | 100/100 | P |
| Comparative Example 52 | B | 1 | 1/100 | P |
| Example 68 | D | 28 | 100/100 | E |
| Example 69 | D | 32 | 100/100 | E |
| Example 70 | D' | 14 | 100/100 | E |
| Example 71 | D' | 14 | 100/100 | E |
| Example 72 | B' | 11 | 100/100 | E |
| Example 73 | B' | 12 | 100/100 | E |
| Example 74 | D | 24 | 100/100 | E |
| Example 75 | B' | 13 | 100/100 | E |
| Comparative Example 53 | B | 1 | 13/100 | P |
| Comparative Example 54 | B' | 6 | 100/100 | F |
| Comparative Example 55 | D' | 13 | 100/100 | F |
| Comparative Example 56 | B' | 6 | 100/100 | F |
| Comparative Example 57 | B' | 4 | 100/100 | P |
| Comparative Example 58 | B | 2 | 100/100 | E |
| Comparative Example 59 | B | 1 | 35/100 | P |
| Comparative Example 60 | B' | 7 | 70/100 | E |
| Comparative Example 61 | B | 4 | 100/100 | P |

| | Kneading conditions | | |
|---|---|---|---|
| | Kneader | Temperature (°C.) | Revolution number (rpm) |
| Example 23 | NVC | 260 | 60 |
| Example 24 | NVC | 260 | 60 |
| Example 25 | NVC | 260 | 60 |
| Example 26 | NVC | 260 | 60 |
| Example 27 | NVC | 260 | 60 |
| Comparative Example 8 | NVC | 260 | 60 |
| Comparative Example 9 | NVC | 260 | 60 |
| Comparative Example 10 | NVC | 260 | 60 |
| Comparative Example 11 | NVC | 260 | 60 |
| Comparative Example 12 | NVC | 260 | 60 |
| Example 28 | NVC | 260 | 60 |
| Example 29 | NVC | 260 | 60 |
| Example 30 | NVC | 260 | 60 |
| Comparative Example 13 | NVC | 260 | 60 |

TABLE 8-continued

| | | | |
|---|---|---|---|
| Comparative Example 14 | NVC | 260 | 60 |
| Comparative Example 15 | NVC | 260 | 60 |
| Comparative Example 16 | NVC | 260 | 60 |
| Example 31 | NVC | 260 | 60 |
| Example 32 | NVC | 260 | 60 |
| Example 33 | NVC | 260 | 60 |
| Example 34 | NVC | 260 | 60 |
| Comparative Example 17 | NVC | 260 | 60 |
| Comparative Example 18 | NVC | 260 | 60 |
| Comparative Example 19 | NVC | 260 | 60 |
| Comparative Example 20 | NVC | 260 | 60 |
| Example 35 | NVC | 260 | 60 |
| Example 36 | NVC | 260 | 60 |
| Example 37 | NVC | 260 | 60 |
| Example 38 | NVC | 260 | 60 |
| Example 39 | NVC | 260 | 60 |
| Comparative Example 21 | NVC | 260 | 60 |
| Comparative Example 22 | NVC | 260 | 60 |
| Comparative Example 23 | NVC | 260 | 60 |
| Comparative Example 24 | NVC | 260 | 60 |
| Comparative Example 25 | NVC | 260 | 60 |
| Example 40 | NVC | 260 | 60 |
| Example 41 | NVC | 260 | 60 |
| Example 42 | NVC | 260 | 60 |
| Example 43 | NVC | 260 | 60 |
| Comparative Example 26 | NVC | 260 | 60 |
| Comparative Example 27 | NVC | 260 | 60 |
| Comparative Example 28 | NVC | 260 | 60 |
| Example 44 | NVC | 260 | 60 |
| Example 45 | NVC | 260 | 60 |
| Example 46 | NVC | 260 | 60 |
| Comparative Example 29 | NVC | 260 | 60 |
| Comparative Example 30 | NVC | 260 | 60 |
| Comparative Example 31 | NVC | 260 | 60 |
| Example 47 | NVC | 260 | 60 |
| Example 48 | NVC | 260 | 60 |
| Example 49 | NVC | 260 | 60 |
| Example 50 | NVC | 260 | 60 |
| Example 51 | NVC | 260 | 60 |
| Comparative Example 32 | NVC | 260 | 60 |
| Comparative Example 33 | NVC | 260 | 60 |
| Comparative Example 34 | NVC | 260 | 60 |
| Comparative Example 35 | NVC | 260 | 60 |
| Comparative Example 36 | NVC | 260 | 60 |
| Example 52 | NVC | 260 | 60 |
| Example 53 | NVC | 260 | 60 |
| Example 54 | NVC | 260 | 60 |
| Comparative Example 37 | NVC | 260 | 60 |
| Comparative Example 38 | NVC | 260 | 60 |
| Comparative Example 39 | NVC | 260 | 60 |
| Comparative Example 40 | NVC | 260 | 60 |
| Example 55 | NVC*[i] | 260 | 60 |
| Example 56 | NVC' | 260 | 60 |
| Example 57 | NVC' | 260 | 60 |
| Example 58 | NVC' | 260 | 60 |
| Comparative Example 41 | NVC*[j] | 260 | 60 |
| Comparative Example 42 | NVC' | 260 | 60 |
| Comparative Example 43 | NVC' | 260 | 60 |
| Comparative Example 44 | NVC' | 260 | 60 |
| Example 59 | NVC | 260 | 60 |
| Example 60 | NVC | 260 | 60 |
| Example 61 | NVC | 260 | 60 |
| Example 62 | NVC | .260 | 60 |
| Example 63 | NVC | 260 | 60 |
| Comparative Example 45 | NVC | 260 | 60 |
| Comparative Example 46 | NVC | 260 | 60 |
| Comparative Example 47 | NVC | 260 | 60 |
| Comparative Example 48 | NVC | 260 | 60 |
| Comparative Example 49 | NVC | 260 | 60 |
| Example 64 | NVC | 260 | 60 |
| Example 65 | NVC | 260 | 60 |
| Example 66 | NVC | 260 | 60 |
| Example 67 | NVC | 260 | 60 |
| Comparative Example 50 | NVC | 260 | 60 |
| Comparative Example 51 | NVC | 260 | 60 |
| Comparative Example 52 | NVC | 260 | 60 |
| Example 68 | NVC | 260 | 60 |
| Example 69 | NVC | 260 | 60 |
| Example 70 | NVC | 260 | 60 |
| Example 71 | NVC | 260 | 60 |
| Example 72 | NVC | 260 | 60 |
| Example 73 | NVC | 260 | 60 |
| Example 74 | NVC | 260 | 60 |
| Example 75 | NVC | 260 | 60 |
| Comparative Example 53 | NVC | 260 | 60 |
| Comparative Example 54 | NVC | 260 | 60 |
| Comparative Example 55 | NVC | 260 | 60 |
| Comparative Example 56 | NVC | 260 | 60 |
| Comparative Example 57 | NVC | 260 | 60 |
| Comparative Example 58 | NVC | 260 | 60 |
| Comparative Example 59 | NVC | 260 | 60 |
| Comparative Example 60 | NVC | 260 | 60 |
| Comparative Example 61 | NVC | 260 | 60 |

*[a]Percentage based on the total amount of components (i) and (ii)
*[b]Proportion to a total of 100 parts by weight of components (i) and (ii)
*[c]Notched Izod impact strength (kg · cm/cm)
*[d]Visual observation
*[e]PE-1 and FAP-10 previously kneaded by NVC (220° C.), blended with PC-3
*[f]PE-1 and NMP-10 previously kneaded in accordance with Example 7
*[g]MBS elastomer (C223, produced by Mitsubishi Rayon Co., Ltd.) added in an amount of 8 parts by weight based on a total of 100 parts by weight of components (i), (ii) and (iii)
*[h]MBS elastomer (C223, produced by Mitsubishi Rayon Co., Ltd.) added in an amount of 8 parts by weight in accordance with Example 12
*[i]Cross-cut adhesion test (number of squares peeled/100 squares)
*[j]Visual observation In accordance with the present invention, a formamide group or a formamide group and a primary amino group can be incorporated in side chains in various high-molecular wight compounds via an imide group or an amide group. Thus, a novel copolymer can be provided which can find a wide application such as a high-molecular weight amino reagent, a starting material for functional high-melcular weight compound, a starting material for adhesives, a polymer compatibilizer, and a resin modifier and can undergo hydrolysis is to produce an active primary amino group.

Further, by blending a formamide group-containing copolymer containing a small amount of a gel component with a system of a mixture of an engineering plastic and a general-purpose resin, the miscibility of the two components can be enhanced, and a resin composition can thus be provided which exhibits excellent impact resistance, particularly face impact strength and Izod impact strength, and excellent weathering resistance and solvent resistance, without causing problems such as peeling and poor external appearance.

Accordingly, the resin of the present invention can be expected to find a wide and effective application in an interior automotive trim, an office automation apparatus housing material, a household applicance, etc.

While the invention has been described in detail and with reference to specific embodiments thereof, it will be apparent to one skilled in the art that various changes and modifications can be made therein without departing from the spirit and scope thereof.

What is claimed is:

1. A composition comprising 100 parts by weight of a mixture of (i) from 5 to 95% by weight of a thermoplastic resin containing a functional group capable of reacting with an amino group; (ii) from 95 to 5% by weight of an olefinic polymer, a styrenic polymer, or both; and (iii) from 0.05 to 20% by weight, based on 100 parts by weight of the total of the components (i) and (ii), of a copolymer or a salt thereof containing in the molecule thereof:

(A) from 20 to 99.8 mole % of a recurring unit represented by formula (I),
   (B) from 50 to 0 mole % of a recurring unit represented by formula (II),
   (C) a recurring unit containing a unit represented by formula (III), (D) a recurring unit containing a unit represented by formula (IV), and (E) a recurring unit containing a unit represented by formula (V) in a total amount of from 60 to 0.2 mole %, provided that the amount of said recurring unit (C) is at least 0.2 mole %:

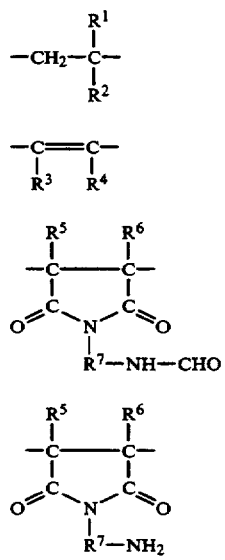

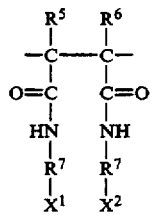

wherein $R^1$ and $R^2$ each independently represents a hydrogen atom, an alkyl group having from 1 to 10 carbon atoms, a cycloalkyl group having from 3 to 8 carbon atoms, an aryl group having from 6 to 10 carbon atoms, an alkenyl group having from 2 to 4 carbon atoms, an alkoxy group having from 1 to 4 carbon atoms, an alkoxycarbonyl group having from 1 to 18 carbon atoms, an alkylcarbonyl group having from 1 to 6 carbon atoms, an arylcarbonyl group having from 6 to 8 carbon atoms, a halogen atom, a nitrile group, or

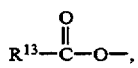

wherein $R^{13}$ is an alkyl group having from 1 to 17 carbon atoms; $R^3$ and $R^4$ each independently represents a hydrogen atom, or an alkyl group having from 1 to 4 carbon atoms, and alkenyl group having from 1 to 4 carbon atoms, or a halogen atom; $R^5$ and $R^6$ each independently represents a hydrogen atom, an alkyl group having from 1 to 6 carbon atoms, or an aryl group having from 6 to 8 carbon atoms; $R^7$ represents an alkylene group having from 1 to 12 carbon atoms, a cycloalkylene group having from 5 to 17 carbon atoms, an arylene group having from 6 to 12 carbon atoms, and arylalkylene group having from 7 to 12 carbon atoms, or a polyoxyalkylene group having from 4 to 30 carbon atoms; $R^1$ to $R^7$ may be each same or different in each of the recurring units; and $X^1$ and $X^2$ each independently represents $NH_2$ or NH—CHO.

2. A composition as in claim 1, wherein said recurring unit (C) is a unit represented by formula (III-A):

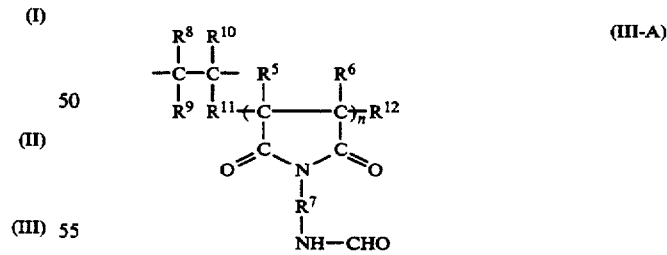

wherein $R^5$, $R^6$ and $R^7$ are as defined in claim 1; $R^8$, $R^9$, and $R^{10}$ each independently represents a hydrogen atom, an alkyl group having from 1 to 10 carbon atoms, a cycloalkyl group having from 3 to 8 carbon atoms, an aryl group having from 6 to 10 carbon atoms, an alkenyl group having from 2 to 4 carbon atoms, an alkoxy group having from 1 to 4 carbon atoms, an alkoxycarbonyl group having from 1 to 18 carbon atoms, an alkylcarbonyl group having from 1 to 6 carbon atoms, an arylcarbonyl group having from 6 to 8 carbon atoms, a halogen atom, a nitrile group, or

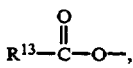

wherein $R^{13}$ is an alkyl group having from 1 to 17 carbon atoms; $R^{11}$ is a mere bond or represents a methylene group or an ethylene group; $R^{12}$ represents a hydrogen atom or an alkyl group having from 1 to 10 carbon atoms; $R^5$ to $R^{12}$ may be each the same or different in each of the recurring units; and n presents an integer of from 1 to 10, provided that when n is 2 or more, $R^5$, $R^6$, and $R^7$ which are each present in a number corresponding to n may be each the same or different.

3. A composition as in claim 1, wherein said recurring unit (D) is a unit represented by formula (IV-A):

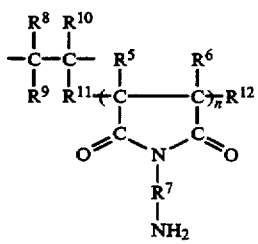

wherein $R^5$, $R^6$ and $R^7$ are as defined in claim 1; $R^8$, $R^9$, $R^{10}$ each independently represents a hydrogen atom, an alkyl group having from 1 to 10 carbon atoms, a cycloalkyl group having from 3 to 8 carbon atoms, an aryl group having from 6 to 10 carbon atoms, an alkenyl group having from 2 to 4 carbon atoms, an alkoxy group having from 1 to 4 carbon atoms, an alkoxycarbonyl group having from 1 to 18 carbon atoms, an alkylcarbonyl group having from 1 to 6 carbon atoms, an arylcarbonyl group having from 6 to 8 carbon atoms, a halogen atom, a nitrile group, or

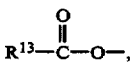

wherein $R^{13}$ is an alkyl group having from 1 to 17 carbon atoms; $R^{11}$ is a mere bond or represents a methylene group or an ethylene group; $R^{12}$ represents a hydrogen atom or an alkyl group having from 1 to 10 carbon atoms; $R^5$ to $R^{12}$ may be each the same or different in each of the recurring units; and n presents an integer of from 1 to 10, provided that when n is 2 or more, $R^5$, $R^6$, and $R^7$ which are each present in a number corresponding to n may be each the same or different.

4. A composition as in claim 1, wherein said recurring unit (E) is a unit represented by formula (V-A):

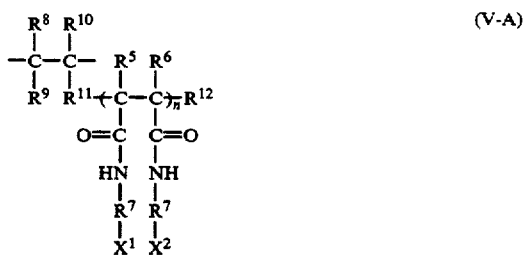

wherein $R^5$, $R^6$, $R^7$, $X^1$, and $X^2$ are as defined in claim 1; $R^8$, $R^9$, and $R^{10}$ each independently represents a hydrogen atom, an alkyl group having from 1 to 10 carbon atoms, a cycloalkyl group having from 3 to 8 carbon atoms, an aryl group having from 6 to 10 carbon atoms, an alkenyl group having from 2 to 4 carbon atoms, an alkoxy group having from 1 to 4 carbon atoms, an alkoxycarbonyl group having from 1 to 18 carbon atoms, an alkylcarbonyl group having from 1 to 6 carbon atoms, an arylcarbonyl group having from 6 to 8 carbon atoms, a halogen atom, a nitrile group, or

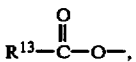

wherein $R^{13}$ is an alkyl group having from 1 to 17 carbon atoms; $R^{11}$ is a mere bond or represents a methylene group or an ethylene group; $R^{12}$ represents a hydrogen atom or an alkyl group having from 1 to 10 carbon atoms; $R^5$ to $R^{12}$ may be each the same or different in each of the recurring units; and n presents an integer of from 1 to 10, provided that when n is 2 or more, $R^5$, $R^6$, and $R^7$ which are each present in a number corresponding to n may be each the same or different.

5. The composition according to claim 1, wherein said mixture is (i) 5% by weight of polycarbonate and (ii) 95% by weight of polypropylene, and (iii) 5% by weight, based on 100 parts by weight of the total of said components (i) and (ii), of said copolymer which is FAP-1.

* * * * *